United States Patent
Liu et al.

(10) Patent No.: US 12,152,820 B2
(45) Date of Patent: Nov. 26, 2024

(54) REFRIGERATION DEVICE, REFRIGERATOR AND CONTROL METHOD THEREFOR, FOOD PROCESSING METHOD AND CONTROL DEVICE

(71) Applicants: HEFEI MIDEA REFRIGERATOR CO., LTD., Hefei (CN); HEFEI HUALING CO., LTD., Hefei (CN); MIDEA GROUP CO., LTD., Foshan (CN)

(72) Inventors: Hua Liu, Hefei (CN); Yun Tang, Hefei (CN); Xueqiang Tang, Hefei (CN); Qingqing Zeng, Hefei (CN)

(73) Assignees: HEFEI MIDEA REFRIGERATOR CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 256 days.

(21) Appl. No.: 17/796,270

(22) PCT Filed: Dec. 23, 2020

(86) PCT No.: PCT/CN2020/138704
§ 371 (c)(1),
(2) Date: Jul. 29, 2022

(87) PCT Pub. No.: WO2021/179734
PCT Pub. Date: Sep. 16, 2021

(65) Prior Publication Data
US 2023/0119128 A1    Apr. 20, 2023

(30) Foreign Application Priority Data
Mar. 12, 2020 (CN) .......................... 202010172075.3

(51) Int. Cl.
*F25B 49/02* (2006.01)
*F25B 6/02* (2006.01)
(Continued)

(52) U.S. Cl.
CPC .............. *F25B 6/02* (2013.01); *F25B 29/003* (2013.01); *F25B 41/20* (2021.01); *F25B 49/02* (2013.01);
(Continued)

(58) Field of Classification Search
CPC .......... F25B 6/02; F25B 41/20; F25B 29/003; F25B 49/02; F25B 2400/0403; F25B 2600/2501
See application file for complete search history.

(56) References Cited

U.S. PATENT DOCUMENTS

| 2011/0126565 A1* | 6/2011 | Tsuruma ................ C12M 41/14 165/59 |
| 2020/0064042 A1 | 2/2020 | Tatsuya et al. |

FOREIGN PATENT DOCUMENTS

| CN | 201569203 U | * | 9/2010 |
| CN | 102853595 A | | 1/2013 |

(Continued)

OTHER PUBLICATIONS

Cui, Refrigeration System, 2016, Full Document (Year: 2016).*
(Continued)

*Primary Examiner* — Nael N Babaa

(57) ABSTRACT

A refrigeration device, a refrigerator, and a control method therefor, a food processing method and a control device. The refrigeration device includes a compressor, a condenser, a throttling device and an evaporator, and the compressor, the condenser, the throttling device and the evaporator are sequentially connected to form a refrigerant circulation loop; a connecting pipeline between an exhaust port of the com-
(Continued)

pressor and a refrigerant inlet of the throttling device in the refrigerant circulation loop is a first connecting pipeline; and the condenser is arranged on the first connecting pipeline. The refrigeration device further includes an auxiliary heat exchange branch, and the auxiliary heat exchange branch includes a condensing heater for heating a heating region, and is arranged on the first connecting pipeline in parallel; and a first valve device is further arranged on the auxiliary heat exchange branch.

8 Claims, 8 Drawing Sheets

(51) Int. Cl.
    *F25B 29/00*     (2006.01)
    *F25B 41/20*     (2021.01)

(52) U.S. Cl.
    CPC ................ *F25B 2400/0403* (2013.01); *F25B 2600/2501* (2013.01)

(56) References Cited

FOREIGN PATENT DOCUMENTS

| CN | 103175366 A | * | 6/2013 |
|---|---|---|---|
| CN | 105605858 A | | 5/2016 |
| CN | 105698463 A | | 6/2016 |
| CN | 105758044 A | * | 7/2016 |
| CN | 106595181 A | | 4/2017 |
| CN | 107024059 A | | 8/2017 |
| CN | 109827375 A | | 5/2019 |
| CN | 109945582 A | | 6/2019 |
| CN | 209840498 U | | 12/2019 |
| CN | 110657629 A | | 1/2020 |
| CN | 110671889 A | | 1/2020 |
| JP | H0436575 A | | 2/1992 |
| JP | 2008035814 A | | 2/2008 |
| KR | 20080054523 A | | 6/2008 |
| KR | 20120064144 A | | 6/2012 |

OTHER PUBLICATIONS

Geng, Evaporative cooling . . . , 2009, Full Document (Year: 2009).*
Chen, Energy-saving type precise temperature control refrigeratory based on double condensers, 2013, Full Document (Year: 2013).*
First OA received in Japanese Patent Application No. 2022-544787, mailed Aug. 1, 2023.
European search opinion mailed May 11, 2023 regarding EP Application No. 20923781.7.
Supplementary European search report regarding EP Application No. 20923781.7.
International Search Report mailed Mar. 24, 2021 of PCT/CN2020/138704.
Written Opinion issued Mar. 24, 2021 by International Search Authority for PCT/CN2020/138704.
First OA mailed Jan. 25, 2022 of CN Application No. 202010172075.3.

* cited by examiner

As a temperature in a heating area is heated to a preset heating temperature range, close a first valve device to make the temperature in the heating area be slowly reduced in the preset heating temperature range ⸺ 2023

FIG. 11

As a temperature in the heating area is heated to a preset heating temperature range, control an opening degree of the first valve device to keep a temperature in the heating area in the preset heating temperature range ⸺ 2024

FIG. 12

Control a working state of the first valve device to switch to a first working state, so that a temperature in the heating area is increased to a preset heating temperature range ⸺ 201

Control the working state of the first valve device to switch to a second working state, so that the temperature in the heating area is kept in the preset heating temperature range ⸺ 202

Control the first valve device to close, so that the temperature in the heating area is reduced to a preset low temperature range ⸺ 203

FIG. 13

REFRIGERATION DEVICE, REFRIGERATOR AND CONTROL METHOD THEREFOR, FOOD PROCESSING METHOD AND CONTROL DEVICE

CROSS-REFERENCES TO RELATED APPLICATIONS

The present disclosure is a national phase application of International Application No. PCT/CN2020/138704, filed on Dec. 23, 2020, which claims priority to Chinese Application No. 202010172075.3, filed on Mar. 12, 2020, the entireties of which are herein incorporated by reference.

FIELD

The present disclosure belongs to the field of household appliance technologies, and more particularly relates to a refrigeration device, a refrigerator, and a control method therefor, a food processing method, a control device, and a storage medium thereof.

BACKGROUND

At present, people's demand for quality of life is getting higher and higher, and the existing refrigerators generally only have the function of refrigeration. For example, a refrigerating chamber, or a freezing chamber is designed for storing food. And with a specific inner temperature the chambers can keep the food fresh. Some refrigerators are equipped with, for example, a defrosting chamber to defrost food. However, the above-mentioned defrosting chambers provide a room whose temperature is only higher than that of the refrigerator or the refrigerating chamber, which cannot meet people's demand for food processing in family life.

SUMMARY

The present disclosure mainly aims at providing a refrigeration device capable of processing food, a refrigerator, and a control method therefor, a food processing method, a control device, and a computer storage medium thereof.

According to one embodiment of the present disclosure, a refrigeration device is provided, including a compressor, a condenser, a throttling device, and an evaporator, and the compressor, the condenser, the throttling device, and the evaporator are connected in a sequence to form a refrigerant circulation loop. A connecting pipeline between an exhaust port of the compressor and a refrigerant inlet of the throttling device in the refrigerant circulation loop is a first connecting pipeline, and the condenser is arranged on the first connecting pipeline, and the refrigeration device further includes:

an auxiliary heat exchange branch, where the auxiliary heat exchange branch includes a condensing heater for heating a heating area. The auxiliary heat exchange branch is arranged in parallel connection with the first connecting pipeline. And a first valve device is further arranged on the auxiliary heat exchange branch, and the first valve device controls a refrigerant flow through the auxiliary heat exchange branch according to a temperature requirement in the heating area.

As a refrigerant with higher temperature flows between the exhaust port of the compressor and the refrigerant inlet of the throttling device through the first connecting pipeline, and the auxiliary heat exchange branch is arranged in parallel connection with the first connecting pipeline, the refrigerant with higher temperature can be introduced into the condensing heater on the auxiliary heat exchange branch, thus heating the heating area. The refrigerant flow through the auxiliary heat exchange branch is controlled by the first valve device, and an independent control for the auxiliary heat exchange branch can be realized. As the auxiliary heat exchange branch is arranged in parallel connection with the first connecting pipeline, adjusting a working state of the first valve device will not affect the normal operation of the refrigerant circulation loop. By controlling the refrigerant flow through the auxiliary heat exchange branch with the first valve device, a temperature in the heating area can be adjusted to meet different temperature requirements on the heating area, and to meet different requirements of people on food processing.

In one embodiment of the present disclosure, the first valve device is provided with a first working state and a second working state, and the first working state is a state that an opening degree of the first valve device is adjusted to a first opening degree, and a temperature is increased in the heating area; and the second working state is one of the following states:
the first valve device is opened in an intermittent way, and the temperature in the heating area is fluctuated in a preset heating temperature range;
the first valve device is closed, and the temperature in the heating area is slowly reduced from the preset heating temperature; and
the opening degree of the first valve device is adjusted to a second opening degree, and the temperature in the heating area is kept in the preset heating temperature range.

The first valve device is provided with the first working state and the second working state, and the first valve device may be switched to the first working state, the second working state or other working states. The first working state corresponds to the state that the opening degree of the first valve device is adjusted to the first opening degree, and a refrigerant flowing through the condensing heater increases the temperature of the heating area. The second working state of the first valve device is used for keeping the temperature of the heating area in the preset heating temperature range.

In an embodiment, the second working state is a state that the first valve device is opened in an intermittent way, and the temperature in the heating area is fluctuated in the preset heating temperature range. The first valve device is opened in an intermittent way, and the temperature of the heating area is maintained within the preset heating temperature range by a heat of intermittent supplement. Because only the temperature detection on the heating is needed to control the opening, the first valve device has a simple control mode by the intermittent opening, and there is no need for complex control algorithm and adjustment of the opening degree of the first valve device, so low-cost valve devices and valve driving devices may be selected.

In another embodiment, the second working state is a state that the first valve device is closed, and the temperature in the heating area reduces slowly from the preset heating temperature. By ensuring a heat-preservation effect of the heating area, for example, the heating area is provided with a heat-preservation layer over an outer wall, and even if the first valve device is closed, as the temperature of the heating area may be slowly reduced, the heating area may be kept in the preset heating temperature range for a duration of time, and to meet the requirements of food processing.

In another embodiment, the second working state is a state that the opening degree of the first valve device is adjusted to the second opening degree, and the temperature in the heating area is kept in the preset heating temperature range. By adjusting the opening degree of the first valve device to the second opening degree, a refrigerant flow through the auxiliary heat exchange branch is controlled, and heating heat of the condensing heater and dissipation heat of the heating area are dynamically balanced, and the temperature in the heating area is kept in the preset heating temperature range. This method has high control accuracy and can stabilize the temperature of the heating area in a small change. In one embodiment, the second opening degree is smaller than the first opening degree.

In one embodiment of the present disclosure, the first valve device switches its working state to the first working state according to the temperature requirement in the heating area, where the opening degree of the first valve device is adjusted to the first opening degree. Once the temperature in the heating area is increased to the preset heating temperature range, the first valve device switches its working state to the second working state to keep the temperature in the heating area in the preset heating temperature range. The preset heating temperature range corresponds to the temperature requirement of the current heating area and is set according to requirements of a user on food processing. The first valve device is arranged to switch between the first working state and the second working state, and the process of heating and temperature controlling in the heating area can be realized and the heating requirements of the user on food processing is fulfilled.

In one embodiment of the present disclosure, the first valve device is a three-way valve. The auxiliary heat exchange branch is connected to the exhaust port of the compressor through the three-way valve at a first end, and the auxiliary heat exchange branch is connected to the refrigerant inlet of the condenser at a second end. By connecting the three-way valve to the exhaust port of the compressor, the refrigerant with higher temperature from the exhaust port of the compressor can enter the auxiliary heat exchange branch, and the heating area can be quickly heated to a temperature high enough to process the food. In addition, since the refrigerant passing through the auxiliary heat exchange branch may pass through the condenser again, the condenser can make full use of the refrigerant passing out of the auxiliary heat exchange branch, thus reducing the influence on the refrigeration effect of the refrigeration device itself.

In one embodiment of the present disclosure, an incubator is further included, where the heating area is arranged in the incubator. The condensing heater is arranged on the incubator. The heating area is arranged in the incubator, and the condensing heater heats the heating area in the incubator, and a temperature in the incubator is not easily dissipated, and the heating effect is effectively improved.

In one embodiment of the present disclosure, the condensing heater includes a condensing heating pipe, and the condensing heating pipe is arranged on the incubator. The heat of the refrigerant with higher temperature in the auxiliary heat exchange branch can be quickly transferred to the incubator through the condensation heating pipe, and the heating effect is good, complicated heat exchange devices or other heat conducting media are not needed, and the cost is low.

In one embodiment of the present disclosure, the condensing heating pipe is arranged at a bottom portion of the incubator. Due to the characteristics of hot air floating up and cooled air falling down, arranging the condensing heating pipe at the bottom portion of the incubator is beneficial to transfer heat of the condensing heating pipe to the heating area in the whole incubator, and the temperature in the heating area is more uniform, which is beneficial to the uniform heating treatment of food.

In one embodiment of the present disclosure, an air duct control device for controlling air circulation between the heating area and a refrigeration area of the refrigerator through an air duct, is further included. The heating area includes the air duct used for communicating with the refrigeration area of the refrigerator, and the air duct control device used for controlling air circulation through the air duct is arranged on the air duct. When the air duct control device is turned on, air in the air duct flows between the heating area and the refrigeration area of the refrigerator, and cooled air in the refrigeration area of the refrigerator can be introduced into the heating area to accelerate the temperature reduction for food treatment. The air duct control device can realize air circulation between the heating area and the refrigeration area of the refrigerator through the air duct, and to meet the complex processing requirements of food that needs to be heated or cooled.

In one embodiment of the present disclosure, the air duct control device includes a fan, and/or a damper for controlling the air duct to open. The fan can control an air flow speed between the heating area and the refrigeration area of the refrigerator, and the cooled air in the refrigeration area of the refrigerator can be introduced into the heating area, and to accelerate the temperature reduction in the heating area. By setting the damper, when the heating area needs to be cooled, the damper can be opened, and the cooled air in the refrigeration area of the refrigerator flows into the heating area through the air duct for circulation, thus realizing the cooling of the heating area. In addition, when the heating area is heated, the damper may be closed to ensure that no refrigeration capacity enters the heating area, thus improving the heating effect of the heating area. One of the fans and the damper, or both of which may be arranged on the air duct at the same time according to actual needs.

In one embodiment of the present disclosure, the first valve device is closed according to the temperature requirement in the heating area, and the air duct control device is turned on according to the temperature requirement in the heating area, and the temperature in the heating area is reduced. In order to meet the demand for heat dissipation or cooling processing of heated food with rapid cooling in the heating area, when the heating area needs to be cooled, the first valve device is closed and the air duct control device is turned on, and the air in the air duct circulates between the heating area and the refrigeration area of the refrigerator, and the cooled air in the refrigeration area of the refrigerator is introduced into the heating area. As the first valve device is closed, the condensing heater is not heated anymore, and at the same time the refrigeration capacity of the refrigeration area of the refrigerator is utilized, thus the temperature of the heating area can be quickly reduced, which can effectively meet the requirements of the user on food processing efficiency and special cooling rate, and can also meet the need of the user on food processing in multi-temperature areas.

In one embodiment of the present disclosure, an air duct control device for controlling air circulation between the heating area and a refrigeration area of the refrigerator is further included. As the first valve device is in the second working state for a preset duration, the first valve device is closed according to the temperature requirement in the heating area, and the air duct control device is turned on according to the temperature requirement in the heating area, and the temperature in the heating area is reduced. As the temperature in the heating area is kept at the preset heating temperature range for a preset duration, the first valve device is closed, and the air duct control device is turned on, and the air in the air duct circulates between the heating area and the refrigeration area of the refrigerator. When the heating area needs to be cooled, the first valve device is closed to stop the refrigerant with higher temperature from continuously entering the auxiliary heat exchange branch, and the air duct control device is turned on to circulate the air in the air duct between the heating area and the refrigeration area of the refrigerator, and the refrigeration area of the refrigerator and the heating area can have thermal interaction through the air duct, and the temperature of the heating area is reduced. As the first valve device is in the second working state for a preset duration, the temperature of the heating area is kept in the preset heating temperature range for the preset duration at the same time, which meets the requirement of the user on cooling food after heating.

In one embodiment of the present disclosure, the preset heating temperature range includes an upper heating temperature threshold and a lower heating temperature threshold. The first valve device may switch its working state to the second working state according to the temperature requirement in the heating area, and the temperature in the heating area is kept between the upper heating temperature threshold and the lower heating temperature threshold. Thus, the first valve device can be freed from repeatedly switching between the first and second working states, and the reliability of the first valve device is increased.

In one embodiment of the present disclosure, two preset heating temperature ranges are included. The first valve device controls the flow of the refrigerant through the auxiliary heat exchange branch according to the temperature requirement in the heating area, and the temperature in the heating area may be switched between the two preset heating temperature ranges above. The user may set more than two preset heating temperature ranges according to the requirements of food to be processed. The temperature in the heating area may be controlled to switch to the more than two preset heating temperature ranges by the refrigerant flowing through the auxiliary heat exchange branch by the first valve device, including controlled by manual switching of the user, switching according to a preset program or heating curve, or switching back and forth. Different processing requirements of the user for heated food are met.

In one embodiment of the present disclosure, a preset low temperature range is further included. The first valve device controls the flow of the refrigerant through the auxiliary heat exchange branch according to the temperature requirement in the heating area, and the temperature in the heating area may be switched between the preset heating temperature range and the preset low temperature range. By closing the first valve device to cut off the heat released from the condensing heater, the heating area may be cooled in this case. When the temperature of the heating area reaches the preset low temperature range, the refrigerant flow through the auxiliary heat exchange branch is controlled by the first valve device to keep the first valve device in the preset low temperature range, and the heating area can be switched between the preset heating temperature range and the preset low temperature range, and the requirement of the user on different temperature treatments of food can be met.

In one embodiment of the present disclosure, two preset heating temperature ranges are included, where one of the two preset heating temperature ranges is the first preset temperature range, and another one is the second preset temperature range. According to the temperature requirement in the heating area, the first valve device in the first working state enable the temperature in the heating area to increase to the first preset temperature range, and the first valve device switches to the second working state, and the temperature in the heating area is kept in the first preset temperature range. As the first valve device is in the second working state for a first preset duration, the first valve device is closed to reduce the temperature in the heating area to the preset low temperature range, and the first valve device switches to the first working state to enable the temperature in the heating area to increase to the second preset temperature range, and the first valve device switches to the second working state for a second preset duration. A lower heating temperature threshold of the first preset temperature range is greater than an upper heating temperature threshold of the second preset temperature range.

By setting two preset heating temperature ranges, the food can be further processed, and the device may be used for processing food like starchy. Taking rice processing as an example, a mixture of rice and water is put into the heating area, the first valve device in the first working state enable the temperature in the heating area to increase to the first preset temperature range, and the first valve device switches to the second working state to keep the temperature in the heating area in the first preset temperature range for the first preset duration, and the rice is gelatinized. As the first valve device is closed, and the temperature in the heating area is reduced to the preset low temperature range, the mixture of rice and water is frozen and thawed. As the first valve device switches to the first working state to make the temperature in the heating area increase to the second preset temperature range, the first valve device switches to the second working state to keep the temperature in the heating area within the second preset temperature range, thus realizing retrogradation of the mixture of rice and water. Through the above treatments, amylose dissolved in the water can be converted into resistant starch which is not easily digested by a human body, and the rice can be physically modified, and a content of the resistant starch in the rice can be significantly increased, and a purpose of lowering sugar in the rice can be achieved, and the transformation of the sugar in food in the human body can be controlled, and the demand of people for food processing can be met.

In one embodiment of the present disclosure, an air duct control device for controlling air circulation between the heating area and a refrigeration area of the refrigerator through an air duct, is further included. As the first valve device switches to the first working state to make the temperature in the heating area increase to the first preset temperature range, the air duct control device is turned on according to the temperature requirement in the heating area; and as the temperature in the heating area reduces to the preset low temperature range, turning off the air duct control device. Through the air duct control device, the air can be circulated along the air duct between the heating area and the refrigeration area of the refrigerator, and the cooled air in the refrigeration area of the refrigerator flows into the heating area through the air duct for circulation, thus realizing the cooling of the heating area, enhancing the cooling efficiency of the heating area, and meeting a timeliness requirement of the user on cooling food.

In one embodiment of the present disclosure, a preset preservation temperature range is further included. As the first valve device is kept in the second working state according to the temperature requirement in the heating area for a second preset duration, the first valve device is turned off, and the air duct control device is turned on according to the temperature requirement in the heating area, and the temperature in the heating area is reduced to the preset preservation temperature range. After the food is processed, the first valve device is turned off, and the air duct control device is turned on, and the temperature of the heating area is reduced to the preset preservation temperature range, and the food is stored in the preset preservation temperature range, and the processed food can be directly kept fresh in the heating area without being additionally taken out and stored by the user.

According to one embodiment of the present disclosure, a refrigerator is provided, including the refrigeration device of any one of embodiments according one embodiment of the present disclosure.

According to one embodiment of the present disclosure, a control method for a refrigeration device is provided, where the refrigeration device includes a compressor, a condenser, a throttling device, and an evaporator. The compressor, the condenser, the throttling device, and the evaporator are connected in a sequence to form a refrigerant circulation loop. A first connecting pipeline is defined as the connecting pipeline between an exhaust port of the compressor and a refrigerant inlet of the throttling device in the refrigerant circulation loop, and the condenser is arranged on the first connecting pipeline. The refrigeration device further includes a heating area and an auxiliary heat exchange branch. The auxiliary heat exchange branch comprises a condensing heater for heating a heating area. The auxiliary heat exchange branch is arranged in parallel connection with the first connecting pipeline. And a first valve device used to control a flow of a refrigerant through the auxiliary heat exchange branch is further arranged on the auxiliary heat exchange branch, and the control method includes the following steps of:

acquiring a temperature requirement of the heating area;
controlling a working state of the first valve device according to the temperature requirement of the heating area.

As a refrigerant with higher temperature flows between the exhaust port of the compressor and the refrigerant inlet of the throttling device through the first connecting pipeline, and the auxiliary heat exchange branch is arranged in parallel connection with the first connecting pipeline, the refrigerant with higher temperature can be introduced into the condensing heater on the auxiliary heat exchange branch, thus heating the heating area. The flow of the refrigerant through the auxiliary heat exchange branch is controlled by the first valve device, and an independent control of the auxiliary heat exchange branch can be realized. As the auxiliary heat exchange branch is arranged in parallel connection with the first connecting pipeline, adjusting a working state of the first valve device will not affect the normal operation of the refrigerant circulation loop. By controlling the refrigerant flow through the auxiliary heat exchange branch with the first valve device, a temperature in the heating area can be adjusted to meet different temperature requirements on the heating area, and to meet different requirements of people on food processing.

In one embodiment of the present disclosure, the controlling the working state of the first valve device according to the temperature requirement of the heating area includes:

controlling the working state of the first valve device to switch to a first working state, and a temperature in the heating area increases to a preset heating temperature range;
controlling the working state of the first valve device to switch to a second working state, and the temperature in the heating area is kept in the preset heating temperature range.

By controlling the first valve device to switch to the first working state, the refrigerant flow through the auxiliary heat exchange branch is adjusted, and the temperature in the heating area increases until reaching the preset heating temperature range. Then, the working state of the first valve device is controlled to the second working state, and the refrigerant flow through the auxiliary heat exchange branch is adjusted to keep the temperature in the heating area in the preset heating temperature range. The preset heating temperature range corresponds to a current temperature requirement of the heating area and is set according to the requirements of the user on food processing, and the process of increasing and controlling the temperature of the heating area is realized by switching the first valve device between the first working state and the second working state, to meet the heating requirements of the user on food.

The controlling the working state of the first valve device to switch the second working state, and the temperature in the heating area is kept in the preset heating temperature range, includes one of the following steps of:

controlling the first valve device to open in an intermittent way, and the temperature in the heating area is fluctuated in the preset heating temperature range;
closing the first valve device, and the temperature in the heating area is slowly reduced within the preset heating temperature;
controlling an opening degree of the first valve device, and the temperature in the heating area is kept in the preset heating temperature range.

In one embodiment of the present disclosure, the temperature in the heating area may be kept in the preset heating temperature range through the three methods above.

The first method is to control the first valve device to be opened in an intermittent way, and to maintain the temperature of the heating area in the preset heating temperature range by a heat of intermittent supplement. Because only the temperature detection on the heating is needed to control the opening, the first valve device has a simple control mode by the intermittent opening, and there is no need for complex control algorithm and adjustment of the opening degree of the first valve device, so low-cost valve devices and valve driving devices may be selected.

The second method is to close the first valve device, making the temperature in the heating area be slowly reduced within the preset heating temperature. By ensuring a heat-preservation effect of the heating area, for example, an outer wall of the heating area is provided with a heat-preservation layer, and even if the first valve device is closed, as the temperature of the heating area may be slowly reduced, the heating area may be kept in the preset heating temperature range for a duration of time, and to meet the requirements of food processing.

The third method is to control the opening degree of the first valve device be adjusted to the second opening degree, making the temperature in the heating area be kept in the preset heating temperature range. By adjusting the opening degree of the first valve device to the second opening degree, the flow of the refrigerant through the auxiliary heat exchange branch is controlled, and heating heat of the condensing heater and dissipation heat of the heating area are dynamically balanced, and the temperature in the heating area is kept in the preset heating temperature range. This method has high control accuracy and can stabilize the temperature of the heating area in a small change.

In one embodiment of the present disclosure, the following step is further included:

as the first valve device is kept in the second working state for a preset duration, controlling the first valve device to be closed, and making the temperature in the heating area be reduced to a preset low temperature range.

By closing the first valve device to cut off the heat released from the condensing heater, and the heating area may be cooled in this case. When the temperature of the heating area reaches the preset low temperature range, the working state of the first valve device is controlled to keep the first valve device in the preset low temperature range, and the heating area can be switched between the preset heating temperature range and the preset low temperature range, and the requirement of the user on different temperature treatments of food can be met.

In one embodiment of the present disclosure, the heating area includes an air duct for communicating with a refrigeration area of the refrigerator, and an air duct control device for controlling air circulation through the air duct is arranged on the air duct; and the making the temperature in the heating area be reduced to the preset low temperature range includes:

controlling the first valve device to turn on to make air circulate in the heating area and the refrigeration area of the refrigerator, and the temperature in the heating area is reduced to the preset low temperature range.

In order to meet the demand for heat dissipation or cooling processing of heated food with rapid cooling in the heating area, when the heating area needs to be cooled, the air duct control device is controlled to turn on, and the air in the air duct circulates between the heating area and the refrigeration area of the refrigerator, and the cooled air in the refrigeration area of the refrigerator is introduced into the heating area. As the refrigeration capacity of the refrigeration area of the refrigerator is utilized, the temperature of the heating area can be quickly reduced, which can effectively meet the requirements of the user on food processing efficiency and special cooling rate and can also meet the need of the user on food processing in multi-temperature areas.

According to one embodiment of the present disclosure, a food processing method applicable to a refrigeration device is provided, where the refrigeration device includes a compressor, a condenser, a throttling device, and an evaporator. The compressor, the condenser, the throttling device, and the evaporator are connected in a sequence to form a refrigerant circulation loop. A first connecting pipeline is defined as the connecting pipeline between an exhaust port of the compressor and a refrigerant inlet of the throttling device in the refrigerant circulation loop. The condenser is arranged on the first connecting pipeline. And the refrigeration device further includes a heating area and an auxiliary heat exchange branch. The auxiliary heat exchange branch comprises a condensing heater for heating a heating area. The auxiliary heat exchange branch is arranged in parallel connection with the first connecting pipeline. And a first valve device which controls a refrigerant flow of the auxiliary heat exchange branch is further arranged on the auxiliary heat exchange branch. The heating area comprises an air duct for communicating with a refrigeration area of the refrigerator, and an air duct control device for controlling air circulation through the air duct is arranged on the air duct is arranged on the air duct; and the food processing method further includes the following steps of:

controlling the first valve device to switch to a first working state, and a temperature in the heating area is increased to a first preset temperature range;

controlling the first valve device to switch to a second working state, and the temperature in the heating area is kept in the first preset heating temperature range for a first preset duration;

controlling the first valve device to close, and controlling the air duct control device to turn on;

as the temperature in the heating area is reduced to the preset low temperature range, turning off the air duct control device;

controlling the first valve device to switch to the first working state, and the temperature in the heating area is increased to a second preset heating temperature range; and controlling the first valve device to switch to the second working state, and the temperature in the heating area is kept in the second preset heating temperature range for a second preset duration.

By setting two preset heating temperature ranges, the food can be further processed. The device may be used for processing food like starchy. Taking rice processing as an example, a mixture of rice and water is put into the heating area, by controlling the first valve device to switch to the first working state, the temperature in the heating area is increased to the first preset temperature range, and by controlling the first valve device to switch to the second working state, the temperature in the heating area is kept in the first preset temperature range for a first preset duration, and the rice is gelatinized. The first valve device is closed, and after the temperature in the heating area is reduced to the preset low temperature range, the mixture of rice and water is frozen and thawed. After the first valve device switches to the first working state to make the temperature in the heating area increase to the second preset temperature range, the first valve device switches to the second working state to keep the temperature in the heating area in the second preset temperature range, thus realizing retrogradation of the mixture of rice and water. Through the above treatment, amylose dissolved in the water can be converted into resistant starch which is not easily digested by a human body, and the rice can be physically modified, and a content of the resistant starch in the rice can be significantly increased, and a purpose of lowering sugar in the rice can be achieved, and the transformation of the sugar in food in the human body can be controlled, and the demand of people for food processing can be met.

In one embodiment of the present disclosure, the following step is further included: controlling the first valve device to close, turning on the air duct control device, and the air circulates in the heating area and the refrigeration area of the refrigerator, and the temperature in the heating area is reduced to a preset preservation temperature range. After the food is processed, the first valve device is closed, and the air duct control device is turned on, and the temperature of the heating area is reduced to the preset preservation temperature range, and the food is stored in the preset preservation temperature range, and the processed food can be directly kept fresh in the heating area without being additionally taken out and stored by the user.

According to one embodiment of the present disclosure, a control device is provided, including: a memory, a processor, and a computer program stored in the memory and executable on the processor, where when executing the computer program, the processor realizes the control method for the refrigeration device according to any one of embodiments of the one embodiment of the present disclosure or the food processing method according to any one of embodiments of the present disclosure.

According to a sixth of the present disclosure, a refrigerator is provided, including the control device of any one of embodiments of the present disclosure.

In one embodiment of the present disclosure, a computer storage medium storing a computer-executable instruction, where the computer-executable instruction is used for executing the control method for the refrigeration device according to any one of embodiments of the present disclosure or the food processing method according to any one of embodiments of the present disclosure.

One of the foregoing embodiments of the present disclosure at least have one of the following effects:

the auxiliary heat exchange branch arranged in parallel connection with the first connecting pipeline can introduce the refrigerant with higher temperature to the condensing heater on the auxiliary heat exchange branch, thus heating the heating area. The refrigerant flow of the auxiliary heat exchange branch is controlled by the first valve device, and an independent control of the auxiliary heat exchange branch can be realized. As the auxiliary heat exchange branch is arranged in parallel connection with the first connecting pipeline, adjusting a working state of the first valve device will not affect the normal operation of the refrigerant circulation loop. By controlling the refrigerant flow of the auxiliary heat exchange branch with the first valve device, a temperature in the heating area can be adjusted to meet different temperature requirements on the heating area, and to meet different requirements of people on food processing.

BRIEF DESCRIPTION OF THE DRAWINGS

FIG. 11 is a flowchart of a control method for a refrigeration system according to a ninth embodiment of the present disclosure;

FIG. 12 is a flowchart of a control method for a refrigeration system according to a tenth embodiment of the present disclosure;

FIG. 13 is a flowchart of a control method for a refrigeration system according to an eleventh embodiment of the present disclosure;

REFERENCE NUMERALS

Figure 1:
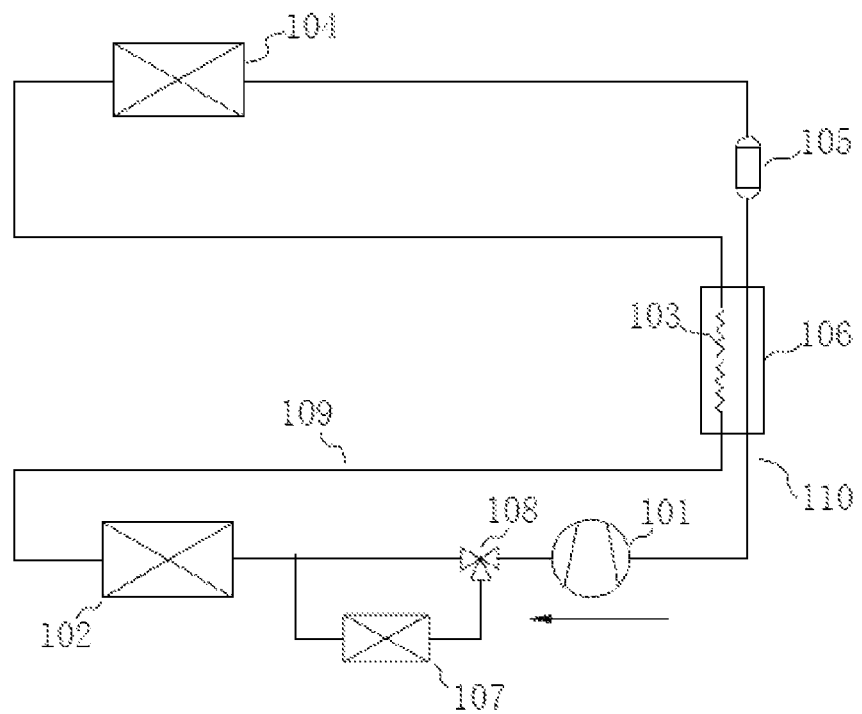
FIG. 1 is a system schematic diagram of a refrigeration device according to a first embodiment and a second embodiment of the present disclosure.

| | |
|---|---|
| 101: compressor; | 102: condenser; |
| 103: throttling device; | 104: evaporator; |
| 105: liquid storage device; | 106: air return and heat exchange pipe; |
| 107: condensing heater; | 108: three-way valve; |
| 109: first connecting pipeline; | 110: second connecting pipeline; |
| 201: incubator; | 202: condensing heating pipe; and |
| 203: air duct. | |

DETAILED DESCRIPTION OF THE DISCLOSURE

Embodiments of the present disclosure are described below in detail, illustrations of which are shown in the accompanying drawings, where identical or similar reference numerals denote identical or similar elements or elements having the same or similar functions throughout. The embodiments described below by reference to the accompanying drawings are exemplary and are intended only to explain the present disclosure and are not to be construed as limiting the present disclosure.

Moreover, the terms "first" and "second" are only used for descriptive purposes but cannot be understood as indicating or implying relative importance, or implicitly indicating the number of indicated embodiments. Therefore, features defined with "first" and "second" can explicitly or implicitly include one or more of the features.

In the description of the present disclosure, it should be noted that unless otherwise specified and limited, the term "connection" should be understood broadly, for example, the connection may be fixed connection or removable connection, and may also be detachable connection or non-detachable connection or integral connection; may be mechanical connection, and may also be electric connection or may be mutual communication; may be direct connection, may also be indirect connection through an intermediate medium, and may also be internal communication and indirect communication of two elements or interaction relationship of two elements.

In the description of the present disclosure, it should be noted that the "first end" and "second end" of each element in the refrigeration device or refrigerator of the present disclosure are only used to indicate an input end or output end of the element, and the uniform naming rule is that a refrigerant input end of the refrigeration device is the "first end" and a refrigerant output end of the refrigeration device is the "second end", which cannot be understood as indicating or implying the relative importance or implicitly indicating the function of the indicated embodiments.

The following disclosure provides multiple different embodiments or examples to realize different solutions of the present disclosure.

Referring to FIG. 1 to FIG. 5, which show a refrigeration device according to one embodiment of the present disclosure. The refrigeration device is a core component of refrigerator equipment and is used to provide refrigeration for a refrigeration area of the refrigerator. The refrigeration area of the refrigerator includes a refrigeration area and a freezing area, where a temperature of the refrigeration area is 2° C. to 8° C. and a temperature of the freezing area is −18° C.

Referring to FIG. 1, which shows a refrigeration device according to a first embodiment of the present disclosure, including a compressor 101, a condenser 102, a throttling device 103 and an evaporator 104, where the compressor 101, the condenser 102, the throttling device 103 and the evaporator 104 are connected in a sequence to form a refrigerant circulation loop for providing refrigeration for the refrigeration area of the refrigerator, and an arrow in FIG. 1 indicates a flow direction of the refrigerant. A connecting pipeline between an exhaust port of the compressor 101 and a refrigerant inlet of the throttling device 103 in the refrigerant circulation loop is a first connecting pipeline 109, the condenser 102 is arranged on the first connecting pipeline 109, and the first connecting pipeline 109 is used for providing the condenser 102 with a refrigerant of higher temperature provided by the compressor 101. A connecting pipeline between a refrigerant outlet of the throttling device 103 and an air return port of the compressor 101 in the refrigerant circulation loop is a second connecting pipeline 110, the evaporator 104 is arranged on the second connecting pipeline 110, and the second connecting pipeline 110 is used for providing the evaporator 104 with a refrigerant of lower temperature. Specifically, a gaseous refrigerant with higher temperature output from the exhaust port of the compressor 101 enters the condenser 102 through a first end of the condenser 102. In the condenser 102, the gaseous refrigerant with higher temperature releases heat and condenses into a liquid refrigerant of higher temperature. The refrigerant is discharged from a second end of the condenser 102, enters a first end of the throttling device 103 through the refrigerant circulation loop, and is cooled in the throttling device 103 to form a liquid refrigerant of lower temperature. The refrigerant is output from a second end of the throttling device 103, and enters from a first end of the evaporator 104. The refrigerant in the evaporator 104 absorbs the heat of the refrigeration area of the refrigerator to form a gaseous refrigerant of lower temperature, and then enters an air inlet of the compressor 101 again. The throttling device 103 above may be a capillary tube, an electronic expansion valve, a thermal expansion valve, or a throttling short pipe. The capillary tube has the advantages of simple structure, convenient manufacture, low price, no moving parts, and is not easy to produce faults and leakage, and it has the characteristics of automatic compensation to meet the requirements of refrigeration load change on flow rate. The electronic expansion valve has strong adaptability to the quantitative change of the refrigerant, which enhances the comfort of the refrigeration device. The thermal expansion valve has a wide applicable temperature range, and can quickly balance high and low pressures of the system when the device is stopped.

With reference to FIG. 1, a reservoir 105 is arranged between a second end of the evaporator 104 and the air inlet of the compressor 101, and is used to store an non-vaporized liquid refrigerant. In addition, an air return and heat exchange pipe 106 may also be arranged between the reservoir 105 and the compressor 101 to absorb the heat released by the throttling device 103, and to increase a temperature of the refrigerant entering the air inlet of the compressor 101.

With reference to FIG. 1, the refrigeration device further includes:
    a heating area used for storing food to be processed, and the heating area may be an incubator, or a heating box arranged in a refrigerating chamber, or an independent chamber of a refrigerator; and
    an auxiliary heat exchange branch, where the auxiliary heat exchange branch includes a condensing heater 107 for heating a heating area, and the auxiliary heat exchange branch is arranged in parallel connection with the first connecting pipeline 109. A first valve device is further arranged on the auxiliary heat exchange branch, and the first valve device controls a refrigerant flow of the auxiliary heat exchange branch according to a temperature requirement in the heating area.

The first valve device is controlled by a controller of the refrigerator, and the controller sends a control instruction to the first valve device according to the temperature requirement in the heating area to control a working state of the first valve device, and the refrigerant flow into the auxiliary heat exchange branch can be controlled. When the refrigerant flow into the auxiliary heat exchange branch is high, the condensing heater 107 releases more heat, and the temperature in the heating area will increase. When the first valve device is closed, the heat released from condensing heater 107 is cut off. If the heating area has an excellent effect on heat-preservation (for example, an outer wall of the heating area is provided with a heat-preservation layer), the temperature of the heating area is reduced slowly. And if the heating area has a good effect on heat-dissipation (without insulation measures or an air duct and an air duct control device as described below), the temperature of the heating area may be reduced rapidly. The working state of the first valve device relates to an opening degree of the first valve device or a change of the opening degree. When the opening degree of the first valve device is the biggest, the refrigerant flow through the auxiliary heat exchange branch is the highest. When the opening degree of the first valve device is zero, the refrigerant flow through the auxiliary heat exchange branch is zero. The opening degree of the first valve device may also be adjusted between zero and the biggest opening degree, for example, an adjustable valve device, either a stepped or stepless one, may be adopted as the first valve device.

As a refrigerant with higher temperature flows between the exhaust port of the compressor 101 and the refrigerant inlet of the throttling device 103 through the first connecting pipeline 109, the auxiliary heat exchange branch is arranged in parallel connection with the first connecting pipeline 109, and the high temperature refrigerant can be introduced into the condensing heater 107 on the auxiliary heat exchange branch, thus heating the heating area. The refrigerant flow of the auxiliary heat exchange branch is controlled by the first valve device, and an independent control of the auxiliary heat exchange branch can be realized. As the auxiliary heat exchange branch is arranged in parallel connection with the first connecting pipeline, adjusting a working state of the first valve device will not affect the normal operation of the refrigerant circulation loop. By controlling the refrigerant flow of the auxiliary heat exchange branch through the first valve device, a temperature in the heating area can be adjusted to meet different temperature requirements on the heating area, and to meet different requirements of people on food processing.

In order to allow the refrigerant to flow through the auxiliary heat exchange branch, the refrigerant in the refrigerant circulation loop needs to flow and circulate while the first valve device is opened, and the compressor 101 also needs to work synchronously. That is, the compressor 101 needs to operate simultaneously when the first valve device is in other working states except being closed.

An operation principle of the compressor 101 is as follows: when the heating area needs heating, it is determined whether there is a refrigerating demand in the current refrigeration area of the refrigerator. If there is a refrigerating demand in the current refrigeration area of the refrigerator, and the refrigerant circulation loop is already in a refrigerating state, the compressor 101 is kept running. If there is no refrigerating demand in the refrigeration area of the refrigerator, it means that the compressor 101 is in a shut-off state, and it is necessary to start the compressor 101.

When the compressor 101 is running, the refrigerant may flow through the condenser 102, which may reduce the temperature of the refrigeration area of the refrigerator. If there is no refrigerating demand in the refrigeration area of the refrigerator, the temperature of the refrigeration area of the refrigerator may be lower than a set temperature of the refrigeration area of the refrigerator. In order to avoid affecting the normal temperature of the refrigeration area of the refrigerator, in one embodiment of the present disclosure, a second valve device may be arranged between the condenser 102 and a second end of the auxiliary heat exchange branch. When there is no refrigerating demand in the refrigeration area of the refrigerator but there is a heating requirement in the heating area, the first valve device is opened and the second valve device is closed, and the refrigerant completely enters the refrigerant circulation loop through the auxiliary heat exchange branch. Because there is no refrigerant flowing through the condenser 102, the temperature of the refrigeration area of the refrigerator may not be reduced. Meanwhile, a heating effect of the heating area is better in a case that all of refrigerant flows through the condensing heater 107 on the auxiliary heat exchange branch.

In another embodiment, there is no need to set a second valve device. If the compressor 101 is started when there is no refrigerating demand in the refrigeration area of the refrigerator, the temperature of the refrigeration area of the refrigerator may be reduced in this case. However, since the heating area may release heat to the refrigeration area of the refrigerator, the compressor 101 may work with the first valve device to cool the refrigeration area of the refrigerator by the evaporator, and the whole refrigerator system may keep a dynamic balance. This requires a heat transfer efficiency between the heating area and the refrigeration area of the refrigerator.

In an embodiment of the present disclosure, the first valve device is provided with a first working state and a second working state, and the first valve device may switch to the first working state, the second working state or other working states.

An opening degree of the first valve device corresponding to the first working state is a first opening degree, and when the opening degree of the first valve device is the first opening degree, the refrigerant flowing through the condensing heater 107 increases the temperature of the heating area. The first opening degree of the first valve device may be set according to a heat-preservation performance of the heating area, a heat conversion efficiency of the condensing heater 107 and the temperature of the refrigerant flowing through the condensing heater 107. In order to make the temperature of the heating area reach a preset heating temperature range as soon as possible, in one embodiment, the first opening degree is adjusted to a maximum opening degree of the first valve device.

The second working state of the first valve device is used for keeping the temperature of the heating area in the preset heating temperature range. In an embodiment, the second working state is that the first valve device is opened in an intermittent way, and the temperature in the heating area is fluctuated in the preset heating temperature range. The first valve device is intermittently opened, and the temperature of the heating area is maintained at the preset heating temperature range by a heat of intermittent supplement. Because only the temperature detection on the heating is needed to control the opening, the first valve device has a simple control mode by the intermittent opening, and there is no need for complex control algorithm and adjustment of the opening degree of the first valve device, so low-cost valve devices and valve driving devices may be selected.

In another embodiment, the second working state is that the first valve device is closed, and the temperature in the heating area is slowly reduced within the preset heating temperature. By ensuring a heat-preservation effect of the heating area, for example, an outer wall of the heating area is provided with a heat-preservation layer, and even if the first valve device is closed, as the temperature of the heating area may be slowly reduced, the heating area may be kept in the preset heating temperature range for a duration of time, and to meet the requirements of food processing.

In another embodiment, the second working state is that the opening degree of the first valve device is adjusted to the second opening degree, and the temperature in the heating area is kept in the preset heating temperature range. By adjusting the opening degree of the first valve device to the second opening degree, the refrigerant flow of the auxiliary heat exchange branch is controlled, and heating heat of the condensing heater 107 and dissipation heat of the heating area are dynamically balanced, and the temperature in the heating area is kept in the preset heating temperature range. This method has high control accuracy and can stabilize the temperature of the heating area in a small change. The second opening degree is smaller than the first opening degree. For example, if the first opening degree is the maximum opening degree of the first valve device, the second opening degree may be opened 80% of the first opening degree. The above value is just one of the possible examples, and a specific value to be set is based on a heat dissipation situation of the heating area and the heating heat of the condensing heater 107. By setting the second opening degree, the temperature in the heating area may be kept in the preset heating temperature range.

In one embodiment of the present disclosure, the controller controls the first valve device to switch to the first working state according to the temperature requirement in the heating area. As adjusted to the first opening degree, and the temperature in the heating area is increased to the preset heating temperature range, the controller controls the first valve device to switch to the second working state to keep the temperature in the heating area in the preset heating temperature range. The preset heating temperature range corresponds to the temperature requirement of the current heating area and is set according to requirements of a user on food processing, and the first valve device switches between the first working state and the second working state, thus realizing the process of heating, and controlling the temperature in the heating area and meeting the heating requirements of the user on food processing.

In one embodiment of the present disclosure, more than two preset heating temperature ranges above are further included. The controller controls the working state of the first valve device according to the temperature requirement in the heating area, and the temperature in the heating area may be switched between the more than two preset heating temperature ranges above. For example, the temperature is switched from the preset heating temperature range to a second preset heating temperature range. The preset heating temperature range may be set according to a heating curve of the food to be processed. For example, if there are three heating procedures with different temperature ranges in the heating curve of the food, three preset heating temperature ranges are set. In addition, a number and a scope of the preset heating temperature range may be set by user input, and may also be automatically adapted according to a weight of the food and the processing method. The temperature may also be switched back and forth between different preset heating temperature ranges. By setting different preset heating temperature ranges, different processing requirements of the user on different food can be met.

In one embodiment of the present disclosure, a preset low temperature range is further included, and the controller controls the working state of the first valve device according to the temperature requirement in the heating area, and the temperature in the heating area may be switched between the preset heating temperature range and the preset low temperature range. By closing the first valve device, the condensing heater is stopped to release heat, and the heating area may be cooled in this case. When the temperature of the heating area reaches the preset low temperature range, the working state of the first valve device is controlled by the controller to keep the first valve device in the preset low temperature range, and the heating area can be switched between the preset heating temperature range and the preset low temperature range, and the requirement of the user on different temperature treatments of food can be met.

Regarding the working state of the first valve device is the first working state, in an embodiment, the first opening degree is the maximum opening degree of the first valve device, and the refrigerant flow of the auxiliary heat exchange branch can be maximized, the heat released by the condensing heater 107 can be the highest, the heating area can be increased to the preset heating temperature range faster, and the time for heating the food can be saved. In another embodiment, the first opening degree can increase the temperature of the heating area. In other words, the heat released by the condensing heater 107 is greater than the dissipation heat of the heating area, which can gradually increase the temperature of the heating area. This will reduce the heating efficiency of the heating area, but has little impact on the refrigerant circulation loop. In addition, the opening degree of the first valve device may also be adjusted according to a state of the refrigeration area of the refrigerator, and the opening degree can meet the heating demand of the heating area and reduce the impact on the refrigeration area of the refrigerator.

Regarding the second working state of the first valve device, the making the temperature in the heating area be kept in the preset heating temperature range, may include one of the following three methods.

The first method is to control the first valve device to open in an intermittent way, and to maintain the temperature of the heating area in the preset heating temperature range by a heat of intermittent supplement. Because only the temperature detection on the heating is needed to control the opening, the first valve device has a simple control mode by the intermittent opening, and there is no need for complex control algorithm and adjustment of the opening degree of the first valve device, so low-cost valve devices and valve driving devices may be selected.

The second method is to close the first valve device to make the temperature in the heating area be slowly reduced within the preset heating temperature. By ensuring a heat-preservation effect of the heating area, and even if the first valve device is closed, as the temperature of the heating area may be slowly reduced, the heating area may be kept in the preset heating temperature range for a duration of time, and to meet the requirements of food processing. The heat-preservation effect of the heating area can be ensured by arranging a heat-preservation layer over an outer wall of the heating area.

The third method is to control an opening degree of the first valve device, and the temperature in the heating area is kept in the preset heating temperature range. By adjusting the opening degree of the first valve device, the refrigerant flow of the auxiliary heat exchange branch is controlled, and heating heat of the condensing heater and dissipation heat of the heating area are dynamically balanced, and the temperature in the heating area is kept in the preset heating temperature range. This method has high control accuracy and can stabilize the temperature of the heating area in a small change.

Referring to FIG. 1, showing a refrigeration device of a second embodiment of the present disclosure, which is a further improvement of the first embodiment of the present disclosure. The first valve device is a three-way valve 108. A first end of the auxiliary heat exchange branch is connected to the exhaust port of the compressor 101 through the three-way valve 108, and a second end of the auxiliary heat exchange branch is connected to a refrigerant inlet of the condenser 102. By connecting the three-way valve 108 to the exhaust port of the compressor 101, the refrigerant with higher temperature from the exhaust port of the compressor can enter the auxiliary heat exchange branch, and the heating area can be quickly heated to a temperature high enough to process the food. In addition, since the refrigerant passing through the auxiliary heat exchange branch may pass through the condenser again, the condenser can make full use of the refrigerant flowing out of the auxiliary heat exchange branch, thus reducing the influence on the refrigeration effect of the refrigeration device itself.

Figure 2:
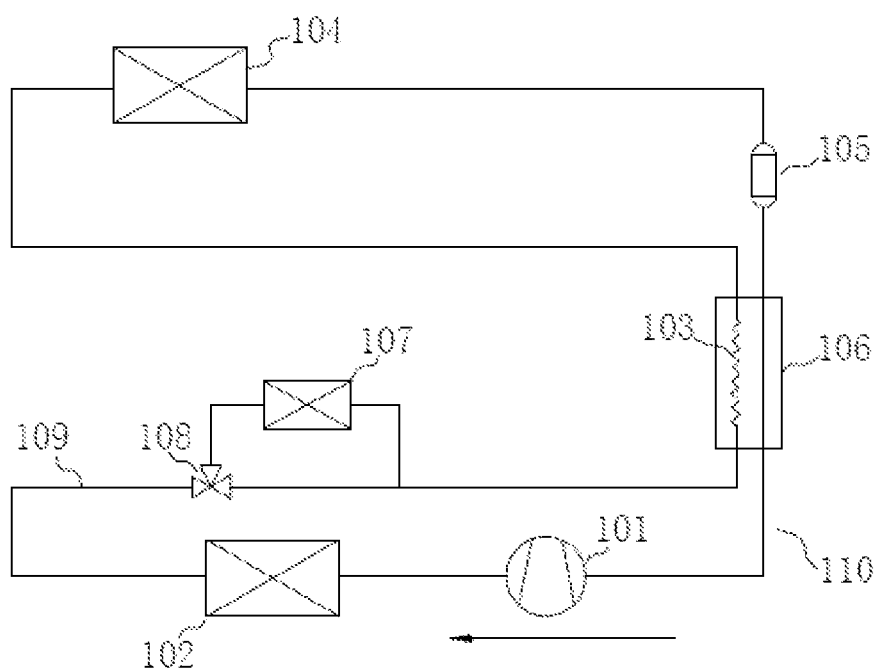
FIG. 2 is a system schematic diagram of a refrigeration device according to a third embodiment of the present disclosure.

Referring to FIG. 2, showing a refrigeration device of a third embodiment of the present disclosure, which is different from the second embodiment above in that the first valve device is a three-way valve 108, the auxiliary heat exchange branch is connected to a refrigerant outlet of the condenser 102 through the three-way valve 108 at a first end, and the auxiliary heat exchange branch is connected to the refrigerant circulation loop between the three-way valve 108 and the throttling device 103 at a second end. When the three-way valve 108 is opened, the refrigerant flows to the throttling device 103 after passing through the auxiliary heat exchange branch. By connecting the three-way valve 108 to the refrigerant outlet of the condenser 102, residual heat of the condenser 102 may be used to provide heat for the condensing heater 107 without using additional heating parts, which not only helps to save the cost, but also releases heat from the refrigerant through the condensing heater 107, which can reduce the temperature of the refrigerant entering the throttling device 103, reduce a load of the evaporator 104, and make the evaporator 104 refrigerate better. Since the refrigerant all passes through the condenser 102 and then through the condensing heater 107, the refrigeration effect of the refrigeration area of the refrigerator may not be affected, and the influence on the overall operation of the refrigerator is less than that of the refrigeration device according to the second embodiment above.

Figure 3:
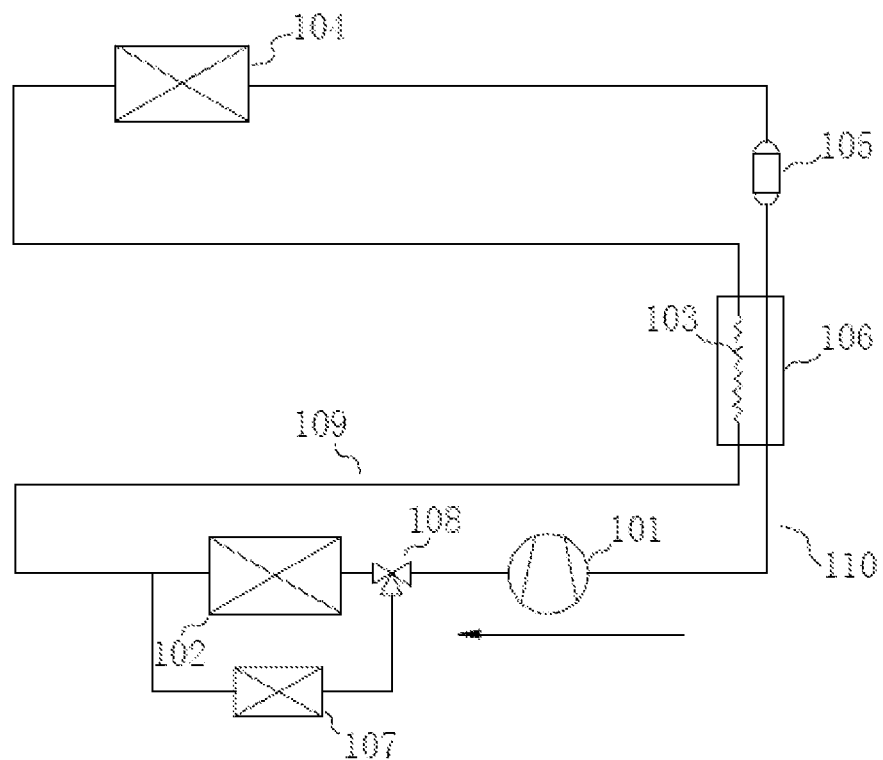
FIG. 3 is a system schematic diagram of a refrigeration device according to a fourth embodiment of the present disclosure.

Referring to FIG. 3, showing a refrigeration device of a fourth embodiment of the present disclosure, which is different from the third embodiment above in that the auxiliary heat exchange branch is in parallel connection with the condenser 102 at two ends, that is, the first end of the auxiliary heat exchange branch is connected between the exhaust port of the compressor and the first end of the condenser through the three-way valve 108, and the second end of the auxiliary heat exchange branch is connected with a refrigerant input end of the throttling device 103. Since the auxiliary heat exchange branch is in parallel connection with the condenser 102 at two ends, portion of the refrigerant with higher temperature discharged from the exhaust port of the compressor 101 enters the auxiliary heat exchange branch, and other portion flows through the condenser 102. Different from the second embodiment and the third embodiment above, the temperatures of the refrigerant flowing through the condenser 102 and the refrigerant flowing through the condensing heater 107 are the same, ensuring a good heating effect, and the influence on the overall operation of the refrigerator is less.

In the above-mentioned second to fourth embodiments, other on-off valves besides the three-way valve 108 may be used as the first valve device. For example, a two-way valve may be arranged in the auxiliary heat exchange branch to control the refrigerant flow in the auxiliary heat exchange branch independently.

In addition, the embodiments may also be combined. For example, two auxiliary heat exchange branches may be arranged at the same time, where one auxiliary heat exchange branch is arranged between the exhaust port of the compressor 101 and a refrigerant inlet of the condensing heater 107, as in the second embodiment, to introduce the high temperature refrigerant at the exhaust port of the compressor 101, and has a higher heating temperature. Meanwhile, the other auxiliary heat exchange branch is arranged between a refrigerant outlet of the condensing heater 107 and the refrigerant inlet of the throttling device 103, as in the third embodiment, to introduce the refrigerant output by the condensing heater 107, and has a lower heating temperature. In this way, an appropriate condensing heater 107 may be selected to work according to the need. For example, condensing heaters 107 respectively corresponding to two heating areas may be set, and in this case a user may select a suitable heating area for use. Otherwise, two condensing heaters 107 corresponding to one heating area may be set, and in this case the user may select a suitable heating mode for use.

The preset heating temperature range includes an upper heating temperature threshold and a lower heating temperature threshold, and the controller controls the working state of the first valve device to switch to the second working state according to the temperature requirement in the heating area, and the temperature in the heating area is kept between the upper heating temperature threshold and the lower heating temperature threshold, thus avoiding repeated switching of the first valve device between the first and second working states and increasing the reliability of the first valve device.

In addition, when the second working state of the first valve device is in an intermittent opening mode, a temperature and a fluctuation range of the heating temperature range can be conveniently determined by setting the upper heating temperature threshold and the lower heating temperature threshold.

Figure 4:
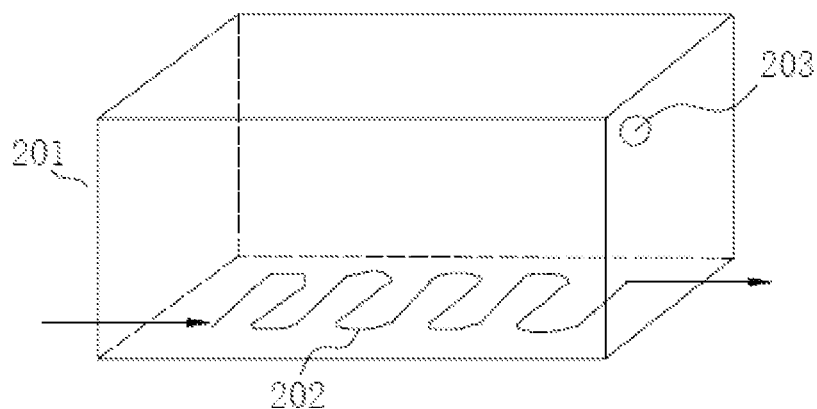
FIG. 4 is a schematic structure diagram of an incubator according to an embodiment of the present disclosure.

Referring to FIG. 4, in an embodiment of the present disclosure, the heating area is arranged in an incubator 201. The incubator 201 may be an independent chamber in the refrigerator or an incubator 201 built into the refrigeration area of the refrigerator, and the condensing heater is arranged on the incubator 201. The heating area is arranged in the incubator, and the condensing heater heats the heating area in the incubator, and a temperature in the incubator is not easily dissipated, and the heating effect is effectively improved.

Referring to FIG. 4, the condensing heater 107 includes a condensing heating pipe 202, and the condensing heating pipe 202 is arranged at a bottom portion of the incubator 201. The heat of the high temperature refrigerant in the auxiliary heat exchange branch can be quickly transferred to the incubator through the condensation heating pipe, and the heating effect is good, complicated heat exchange devices or other heat conducting media are not needed, and the cost is low. Due to the characteristics of hot air floating up and cooled air falling down, arranging the condensing heating pipe 202 at the bottom portion of the incubator 201 is beneficial to transfer heat in the whole incubator space, and the temperature in the heating area is more uniform, which is beneficial to the uniform heating treatment of food. In one embodiment, those skilled in the art may also set an arrangement position of the condensing heating pipe 202 according to the need, such as arranging the condensing heating pipe 202 at the bottom portion and top portion of the incubator 201 or arranging the condensing heating pipe 202 at a side wall of the incubator 201.

Referring to FIG. 4, in an embodiment of the present disclosure, the heating area includes an air duct 203 for communicating with the refrigeration area of the refrigerator. The air duct 203 communicates the heating area and the refrigeration area of the refrigerator. Through the air duct 203, the cooled air from the refrigeration area of the refrigerator may be introduced into the heating area, and to realize the refrigeration and temperature reduction for food, thus being capable of meeting the complex processing requirements of food that needs to be heated and cooled.

In order to control the air duct 203, in an embodiment of the present disclosure, an air duct control device for controlling air circulation through the air duct 203 is arranged on the air duct. By turning on the air duct control device, the air between the heating area and the refrigeration area of the refrigerator in the air duct may circulate, and the cooled air in the refrigeration area of the refrigerator may be introduced into the heating area, and to accelerate the cooling treatment of the food. When the air duct control device is turned off, the air between the heating area and the refrigeration area of the refrigerator in the air duct does not circulate or is not easy to circulate, thus reducing a degree of thermal interaction between the refrigeration area of the refrigerator and the heating area. Through the air duct control device, the cooled air in the refrigeration area of the refrigerator can flow into the heating area through the air duct for circulation, thus realizing the cooling of the heating area, thus being capable of meeting the complex processing requirements of food that needs to be heated and cooled.

One embodiment of the air duct control device is that a fan is arranged right to the air duct, and a blowing direction of the fan is toward an inlet of the air duct 203. By starting the fan, the cooled air in the refrigeration area of the refrigerator may be introduced into the heating area, and the cooled air in the refrigeration area of the refrigerator flows into the heating area through the air duct for circulation, thus realizing the cooling operation of the heating area. Moreover, a cooling efficiency of the heating area can be improved by introducing the cooled air in the refrigeration area of the refrigerator into the heating area.

Another embodiment of the air duct control device is that the air duct 203 is provided with a damper for controlling the air duct to open. When the heating area needs to be cooled, the air duct between the heating area and the refrigeration area of the refrigerator is communicated by opening the damper, and the air in the air duct between the heating area and the refrigeration area of the refrigerator may circulate, and the cooled air in the refrigeration area of the refrigerator may enter the heating area to cool the heating area. When the heating area needs to be heated, the controller controls the damper to close, and to prevent the refrigeration capacity from entering the heating area and improve the heating effect of the heating area.

In some embodiments, the air door and the fan can be set on the air duct at the same time, that is, when the heating area is heated, the controller controls the air door to close to achieve the best heating effect. When the heating area needs to be cooled, the air door is opened and the fan is turned on at the same time, and to accelerate the introduction of cooled air in the refrigeration area of the refrigerator into the heating area.

In addition, in some embodiments, the air duct may not be provided at all, and the heat can be dissipated to the refrigeration area of the refrigerator through a shell of the incubator 201.

The incubator 201 is provided with a condensing heating pipe 202 and an air duct control device. The refrigerant with higher temperature on the first connecting pipe 109 is introduced through the condensing heating pipe 202, and the heating area in the incubator 201 can be heated and insulated. The air duct control device enables the air to circulate between the heating area in the incubator 201 and the refrigeration area of the refrigerator, and the cooled air from the refrigeration area of the refrigerator can enter the incubator 201, and the temperature of the heating area in the incubator 201 can be reduced.

On this basis, when the temperature of the heating area is required to cool down, the first valve device is closed according to the temperature requirement in the heating area, and the air duct control device is turned off according to the temperature requirement in the heating area, and the air in the air duct circulates between the heating area and the refrigeration area of the refrigerator, and the cooled air in the refrigeration area of the refrigerator may be introduced into the heating area. As the first valve device is closed, the condensing heater is not heated anymore, and the temperature of the heating area is quickly reduced, which can effectively meet the requirements of the user on heat dissipation or cooling of the heated food. Meanwhile, due to the utilization of the refrigeration capacity of the refrigeration area of the refrigerator, the temperature in the heating area can be quickly reduced without setting an additional heat dissipation device, which can effectively meet the requirements of the user on food processing efficiency and special cooling rate, and can also meet the need of the user on food processing in multi-temperature areas.

In an embodiment of the present disclosure, the food may be processed by heated first and then frozen. That is, normal-temperature or frozen food is put into the heating area, and the controller controls the first valve device to switch to the first working state to allow the refrigerant of high temperature to enter the condensing heater 107. After the temperature in the heating area is heated to the preset heating temperature range, the controller controls the first valve device to switch to the second working state to keep the temperature in the heating area within the preset heating temperature range. After the food is heated for a period of time, the controller controls the first valve device to close, and stops the refrigerant of high temperature from continuing to enter the auxiliary heat exchange branch. The refrigeration area of the refrigerator and the heating area exchange heat through the air duct 203, and the temperature of the heating area is reduced, thus realizing the processing of heating the food first and then cooling the food.

Besides being heated first and then cooled down, the food can also be heated and cooled down in various sections and times by setting different preset heating temperature ranges.

Figure 5:
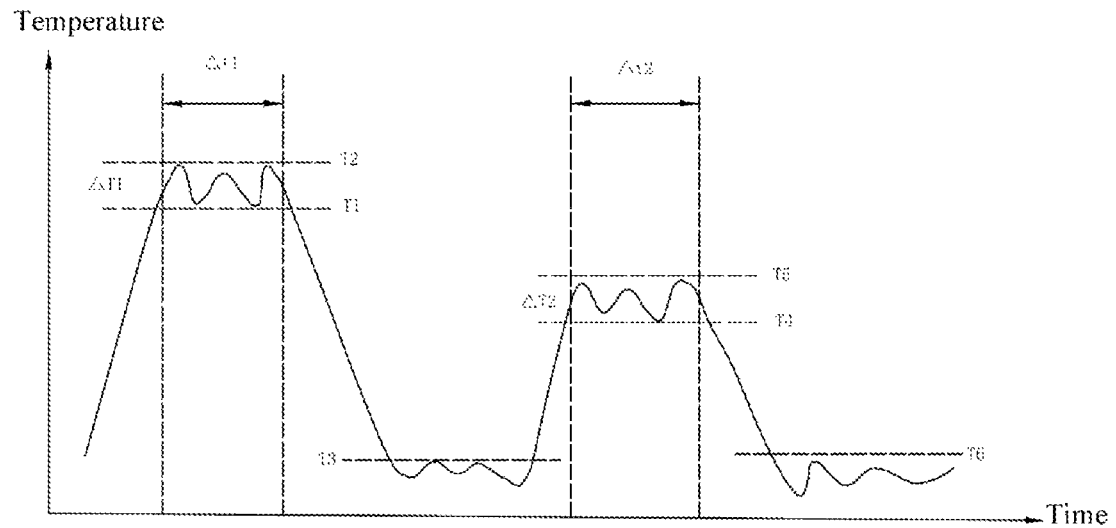
FIG. 5 is a temperature control graph of a refrigeration device according to a fifth embodiment of the present disclosure.

Referring to FIG. 1 and FIG. 5, showing a refrigeration device according to a fifth embodiment of the present disclosure, which includes two preset heating temperature ranges, where one preset heating temperature range is a first preset temperature range $\Delta T1$, and the other preset heating temperature range is a second preset temperature range $\Delta T2$. When the refrigerant circulation loop is in a refrigerating state, the compressor 101 keeps running, the controller controls the first valve device to switch to the first working state to increase the temperature in the heating area to the first preset temperature range $\Delta T1$. The controller controls the first valve device to switch to the second working state, and the first valve device is opened in an intermittent way. That is, when the temperature in the heating area is increased to a first upper heating temperature threshold T2, the first valve device is closed and the temperature in the heating area is reduced. When the temperature is reduced to a first lower heating temperature threshold T1, the first valve device is opened. The temperature in the heating area is controlled to fluctuate within the first preset temperature range $\Delta T1$. When the refrigerant circulation loop is in a heat preservation state, the compressor 101 is operated if the first valve device opens. When the refrigerant circulation loop is in a refrigerating state, the compressor 101 is kept working. A first preset duration $\Delta t1$ of the temperature in the heating area fluctuating in the first preset temperature range $\Delta T1$ may be set according to the actual situation. After the temperature is maintained to fluctuate at the first preset duration $\Delta t1$, the first valve device is closed, and the compressor 101 determines whether to close according to the situation of the refrigeration area of the refrigerator. After the first valve device is closed, the temperature in the heating area is reduced, which may be achieved by natural cooling or blowing cooled air into the heating area through the fan. After the temperature in the heating area is reduced to a preset low temperature range T3, the first valve device is adjusted to increase the temperature in the heating area to the second preset temperature range $\Delta T2$, and the first valve device is intermittently opened to make the temperature in the heating area fluctuate within the second preset temperature range $\Delta T2$ (i.e. between T4 and T5 in FIG. 4) and last for a second preset duration $\Delta t2$. The lower heating temperature threshold T1 of the first preset temperature range $\Delta T1$ is greater than the upper heating temperature threshold T5 of the second preset temperature range $\Delta T2$.

By setting two preset heating temperature ranges, the food can be further processed, and for example, the device in the foregoing embodiments may be used for processing food like starchy. Taking rice processing as an example, a mixture rice and water is put into the heating area, the first valve device is adjusted to make the temperature in the heating area be increased to the first preset temperature range $\Delta T1$, and the first valve device is intermittently opened to make the temperature in the heating area fluctuate in the first preset temperature range $\Delta T1$ and last for the first preset duration $\Delta t1$, and the rice is gelatinized. The first valve device is closed, and after the temperature in the heating area is reduced to the preset low temperature range T3, the mixture of rice and water is frozen and thawed. After the first valve device is adjusted to make the temperature in the heating area be increased to the second preset temperature range $\Delta T2$, the first valve device is intermittently opened to make the temperature in the heating area fluctuate in the second preset temperature range $\Delta T2$ for the second preset duration $\Delta t2$, thus realizing retrogradation of the mixture of rice and water. Through the above treatment, amylose dissolved in the water can be converted into resistant starch which is not easily digested by a human body, and the rice can be physically modified, and a content of the resistant starch in the rice can be significantly increased, and a purpose of lowering sugar in the rice can be achieved, and the transformation of the sugar in food in the human body can be controlled, the processed food is healthier, and the demand of people for food processing can be met.

In an embodiment of the present disclosure, as the temperature in the heating area fluctuates in the second preset temperature range $\Delta T2$ for a second preset duration $\Delta t2$, the first valve device is closed and the air duct control device is turned on, and the temperature in the heating area is reduced to a preset preservation temperature range T6. The food is stored in the preset preservation temperature range, and the processed food can be directly kept fresh in the heating area without being additionally taken out and stored by the user.

Values of T1, T2, T3, T4, T5 and T6 may be set according to the need. In this embodiment, T1 is 60° C., T2 is 75° C., T3 is 0° C.-8° C., T4 is 30° C., T5 is 30° C. and T6 is 2° C.-8° C. The processing of the rice in the above embodiment is only exemplified, and the refrigeration device of the embodiment of the present disclosure may also be used to process other food, such as meat or dairy products.

In the foregoing embodiment, the first valve device is opened in an intermittent way, and the temperature in the heating area is kept in the preset heating temperature range for the preset duration. In addition, the first valve device may be closed or the opening degree of the first valve may be controlled to keep the temperature in the heating area in the preset heating temperature range for the preset duration. The specific implementation method and principle have been described in detail in the above embodiments, and will not be repeated here.

Figure 6:
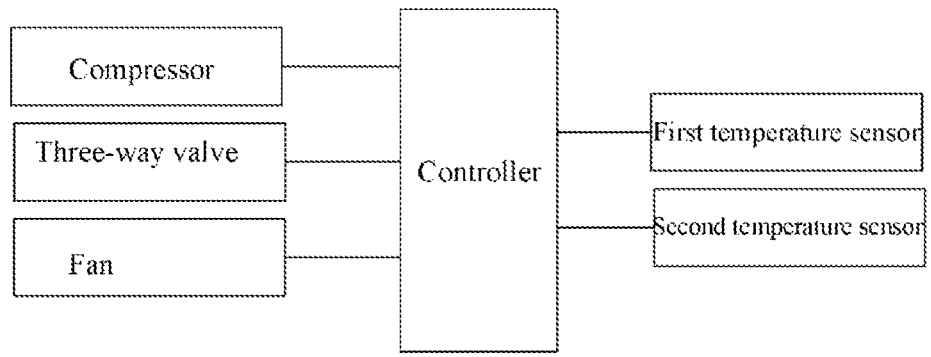
FIG. 6 is a circuitry block diagram of a refrigeration device according to an embodiment of the present disclosure.

Referring to FIG. 6, showing a circuitry block diagram of the refrigeration device according to one embodiment of the present disclosure, which includes a controller, a compressor, a three-way valve, a fan, a first temperature sensor and a second temperature sensor, where the first temperature sensor is arranged in the heating area, such as the incubator, for detecting the temperature in the heating area and to control the operation of the three-way valve or the compressor according to the temperature in the heating area. And the second temperature sensor is arranged in the refrigeration area of the refrigerator for detecting the temperature in the refrigeration area of the refrigerator and to control the operation of the compressor according to the temperature in the refrigeration area of the refrigerator. The controller is electrically connected to the controller, the compressor, the three-way valve, the fan, the first temperature sensor and the second temperature sensor respectively, and the controller controls the compressor, the three-way valve, the fan, the first temperature sensor and the second temperature sensor to realize the control process of the above embodiment.

Figure 7:
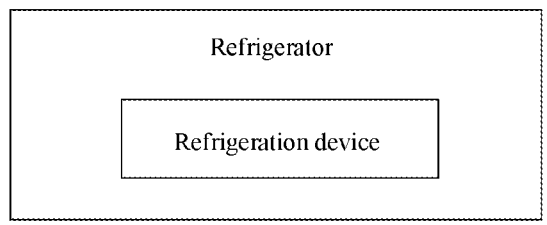
FIG. 7 is a system schematic diagram of a refrigerator according to a sixth embodiment of the present disclosure.

Referring to FIG. 7, showing the refrigerator according to one embodiment of the present disclosure, this is a sixth embodiment of the present disclosure. In this embodiment, the refrigeration device in any one of the first to fifth embodiments above is included. Since the refrigeration device according to the embodiment of the present disclosure has the effects of any of the first to fourth embodiments above, the refrigerator according to this embodiment also has the above-mentioned effects. As refrigerant with higher temperature flows between the exhaust port of the compressor 101 and the throttling device 103 through the refrigerant circulation loop, the auxiliary heat exchange branch is arranged between the exhaust port of the compressor 101 and the throttling device 103 in parallel, the refrigerant with higher temperature can be introduced into the condensing heater on the auxiliary heat exchange branch, thus heating the heating area. The opening and closing of the auxiliary heat exchange branch is controlled by the first valve device to realize an independent control of the auxiliary heat exchange branch, and the opening and closing of the first valve device does not affect the normal operation of the refrigerant circulation loop. By controlling the refrigerant flow of the auxiliary heat exchange branch with the first valve device, the temperature in the heating area can be adjusted to meet different temperature requirements on the heating area, and to meet different requirements of people on food processing.

The following is the control method for the refrigeration device according to one embodiment of the present disclosure The following description is only an illustration, but not a specific limitation of the present disclosure.

The control method for the refrigeration device according to the seventh embodiment of the present disclosure is applicable to control the refrigeration devices shown in FIG. 1 to FIG. 6. The control method for the refrigeration device in this embodiment may be executed by the control device of the refrigeration device proposed by the embodiment of the present disclosure, and the control device of the refrigeration device may be configured in the refrigeration device to realize the control of the refrigeration device.

Figure 8:
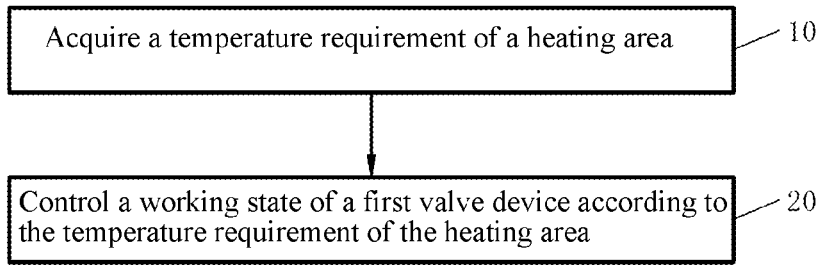
FIG. 8 is a flowchart of a control method for a refrigeration system according to a seventh embodiment of the present disclosure.

Structures shown in FIG. 1 to FIG. 4 and FIG. 6 are described in the first to fifth embodiments, which will not be repeated here. Referring to FIG. 8, the control method for the refrigeration system in this embodiment includes the following steps of:

step 10: acquiring a temperature requirement of the heating area; and step 20: controlling a working state of the first valve device according to the temperature requirement of the heating area.

As refrigerant with higher temperature circuits between the exhaust port of the compressor and the refrigerant inlet of the throttling device through the first connecting pipeline, and the auxiliary heat exchange branch is arranged in parallel connection with the first connecting pipeline, the refrigerant with higher temperature can be introduced into the condensing heater on the auxiliary heat exchange branch, thus heating the heating area. The refrigerant flow of the auxiliary heat exchange branch is controlled by the first valve device, and the independent control of the auxiliary heat exchange branch can be realized. As the auxiliary heat exchange branch is arranged in parallel connection with the first connecting pipeline, adjusting a working state of the first valve device will not affect the normal operation of the refrigerant circulation loop. By controlling the flow of the refrigerant through the auxiliary heat exchange branch with the first valve device, a temperature in the heating area can be adjusted to meet different temperature requirements on the heating area, and to meet different requirements of people on food processing.

Figure 9:
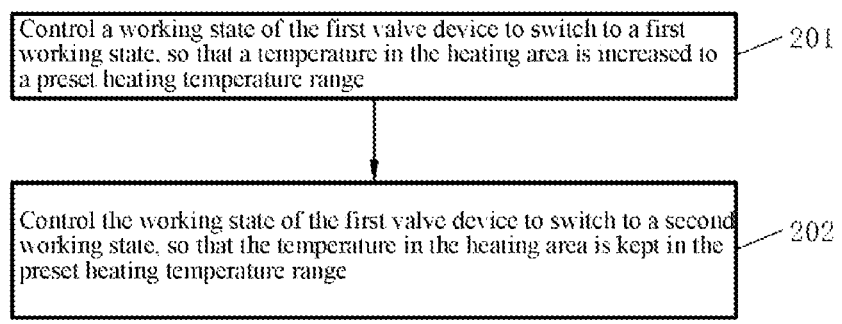
FIG. 9 is a flowchart of a method for an embodiment of step 20 in FIG. 8.

Referring to FIG. 9, the step 20 includes the following steps.

At step 201, the working state of the first valve device is controlled to switch to a first working state, and a temperature in the heating area is increased to a preset heating temperature range.

By controlling the first valve device to switch to the first working state, the refrigerant flow through the auxiliary heat exchange branch is adjusted, and the temperature in the heating area is increased until reaching the preset heating temperature range.

At step 202, the working state of the first valve device is controlled to switch to the second working state, and the temperature in the heating area is kept in the preset heating temperature range.

The preset heating temperature range corresponds to the temperature requirement of the current heating area and is set according to requirements of a user on food processing, and the first valve device switches between the first working state and the second working state, thus realizing the process of heating, and controlling the temperature in the heating area and meeting the heating requirements of the user on food processing.

When the compressor 101 is running, the refrigerant may flow through the condenser 102, which may reduce the temperature of the refrigeration area of the refrigerator. If there is no refrigerating demand in the refrigeration area of the refrigerator, the temperature of the refrigeration area of the refrigerator may be lower than a set temperature of the refrigeration area of the refrigerator. In order to avoid affecting the normal temperature of the refrigeration area of the refrigerator, in one embodiment of the present disclosure, a second valve device may be arranged between the condenser 102 and a second end of the auxiliary heat exchange branch. When there is no refrigerating demand in the refrigeration area of the refrigerator but there is a heating requirement in the heating area, the first valve device is opened and the second valve device is closed, and all of the refrigerant enters the refrigerant circulation loop through the auxiliary heat exchange branch. Because there is no refrigerant flowing through the condenser 102, the temperature of the refrigeration area of the refrigerator may not be reduced. Meanwhile, a heating effect of the heating area is better in a case that all of the refrigerant flows through the condensing heater 107 on the auxiliary heat exchange branch.

In another embodiment, there is no need to set the second valve device. If the compressor 101 is operated when there is no refrigerating demand in the refrigeration area of the refrigerator, the temperature of the refrigeration area of the refrigerator may be reduced in this case. However, since the heating area may release heat to the refrigeration area of the refrigerator, the compressor 101 may work with the first valve device to cool the refrigeration area of the refrigerator through the evaporator, and the whole refrigerator system may keep a dynamic balance. This requires a heat transfer efficiency between the heating area and the refrigeration area of the refrigerator.

The first working state of the first valve device is to open the first valve device to the first opening degree, and the temperature in the heating area is increased. In an embodiment, the first opening degree is the maximum opening degree of the first valve device. In this way, the refrigerant flow of the auxiliary heat exchange branch can be maximized, the heat released by the condensing heater 107 can be the highest, and the temperature in the heating area can be increased to the preset heating temperature range faster, thus saving the time for heating food. In another embodiment, the first opening degree is an opening degree that can increase the temperature of the heating area. In other words, the heat released by the condensing heater 107 is greater than the dissipation heat of the heating area in this case, which can also gradually increase the temperature of the heating area. Although this will reduce the heating efficiency of the heating area, the impact on the refrigerant circulation loop is less. In addition, the opening degree of the first valve device may also be adjusted according to the state of the refrigeration area of the refrigerator to meet the heating demand of the heating area and reduce the impact on the refrigeration area of the refrigerator at the same time.

Figure 10:
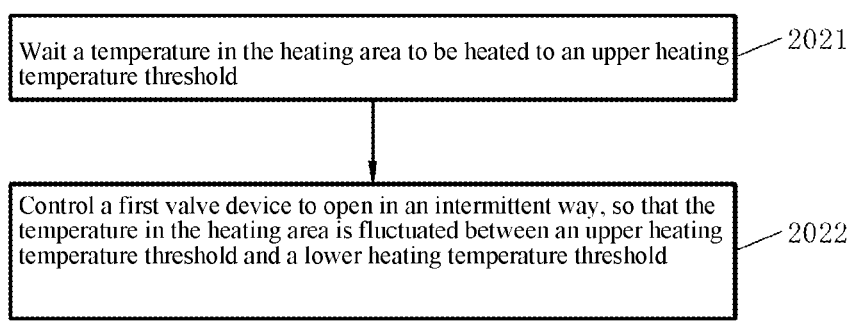
FIG. 10 is a flowchart of a control method for a refrigeration system according to an eighth embodiment of the present disclosure.

Referring to FIG. 10, which shows a control method for a refrigeration device in an eighth embodiment of the present disclosure. The preset heating temperature range includes an upper heating temperature threshold and a lower heating temperature threshold, and the above step 202 includes:

step 2021: waiting the temperature in the heating area to be heated to the upper heating temperature threshold; and step 2022: controlling the first valve device to open in an intermittent way, and the temperature in the heating area is fluctuated between the upper heating temperature threshold and the lower heating temperature threshold.

By setting the upper heating temperature threshold and the lower heating temperature threshold, the temperature and fluctuation range of the heating temperature range can be determined. The temperature in the heating area is kept between the upper heating temperature threshold and the lower heating temperature threshold, which prevents the first valve device from repeatedly switching between the first and second working states and increases the reliability thereof. Moreover, only the temperature detection on the heating is needed to control the opening, the first valve device has a simple control mode by the intermittent opening, and there is no need for complex control algorithm and adjustment of the opening degree of the first valve device, so low-cost valve devices and valve driving devices may be selected.

Referring to FIG. 11, which shows a control method for a refrigeration device in a ninth embodiment of the present disclosure. The preset heating temperature range includes an upper heating temperature threshold and a lower heating temperature threshold, and the above step 202 includes:

step 2023: as the temperature in the heating area is heated to the preset heating temperature range, closing the first valve device to make the temperature in the heating area be slowly reduced in the preset heating temperature.

By ensuring a heat-preservation effect of the heating area, for example, an outer wall of the heating area is provided with a heat-preservation layer, and even if the first valve device is closed, as the temperature of the heating area may be slowly reduced, the heating area may be kept in the preset heating temperature range for a duration of time, and to meet the requirements of food processing.

Referring to FIG. 12, it shows a control method for a refrigeration device in a tenth embodiment of the present disclosure. The preset heating temperature range includes an upper heating temperature threshold and a lower heating temperature threshold, and the above step 202 includes:

step 2024: as the temperature in the heating area is heated to the preset heating temperature range, controlling the opening degree of the first valve device to keep the temperature in the heating area in the preset heating temperature range.

In step 2024, the controlling the opening degree of the first valve device includes: controlling the opening degree of the first valve device to switch to the second opening degree, and controlling the refrigerant flow of the auxiliary heat exchange branch by adjusting the opening degree of the first valve device to the second opening degree, and the heating heat of the condensing heater is dynamically balanced with the dissipation heat of the heating area, and the temperature in the heating area is kept in the preset heating temperature range. This method has high control accuracy, and can stabilize the temperature in the heating area in a smaller scope. The second opening degree is smaller than the first opening degree. For example, if the first opening degree is the maximum opening degree of the first valve device, the second opening degree may be 80% of the first opening degree. The above value is just an example, and the specific value to be set is based on a heat dissipation situation of the heating area and the heating heat of the condensing heater. By setting the second opening degree, the temperature in the heating area may be kept in the preset heating temperature range.

Referring to FIG. 13, it shows a control method for a refrigeration device in an eleventh embodiment of the present disclosure. The step 202 further includes the following step:

step 203: controlling the first valve device to close, and the temperature in the heating area is reduced to the preset low temperature range.

In one embodiment, the above-mentioned step 203 includes: controlling the air duct control device to turn on to make air circulate in the heating area and the refrigeration area of the refrigerator, and make the temperature in the heating area be reduced to the preset low temperature range.

The air in the air duct can circulate between the heating area and the refrigeration area of the refrigerator by the air duct control device. When the heating area needs to be cooled, the first valve device is controlled to be closed and the air duct control device is turned on, and the cooled air in the refrigeration area of the refrigerator flows into the heating area through the air duct for circulation, thus realizing the cooling of the heating area. As the first valve device is closed, the condensing heater is not heated anymore, and the refrigeration capacity of the refrigeration area of the refrigerator is utilized at the same time. The temperature of the heating area can be quickly reduced, which can effectively meet the requirements of the user on food processing efficiency and special cooling rate, and can also meet the need of the user for food processing in multi-temperature areas. Therefore, the complex processing requirements of food that needs to be heated and cooled can be met.

Figure 14:
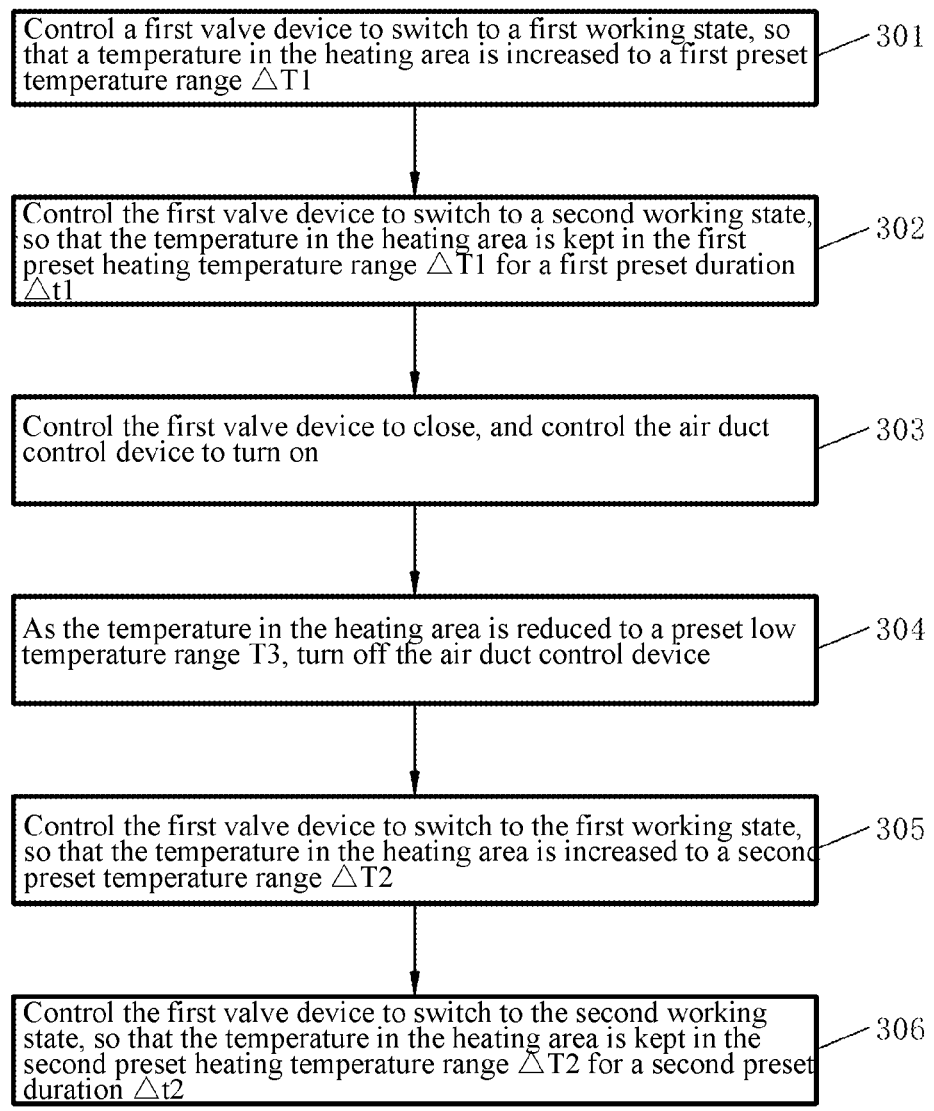
FIG. 14 is a flowchart of a food processing method according to a twelfth embodiment of the present disclosure.

One embodiment of the present disclosure provides a food processing method, which is applicable to control the refrigeration devices shown in FIG. 1 to FIG. 4 and FIG. 6. The control method for the refrigeration device in this embodiment may be executed by the control device of the refrigeration device proposed by the embodiment of the present disclosure, and the control device of the refrigeration device may be configured in the refrigeration device to realize the control of the refrigeration device. The structures shown in FIG. 1 to FIG. 7 are described in the first embodiment to the fifth embodiment, which are not repeated here. Referring to FIG. 5 and FIG. 14, as a twelfth embodiment of the present disclosure, the food processing method of this embodiment includes the following steps of:

step 301: controlling the first valve device to switch to a first working state, and a temperature in the heating area is increased to a first preset temperature range $\Delta T1$;

step 302: controlling the first valve device to switch to a second working state, and the temperature in the heating area is kept in the first preset heating temperature range $\Delta T1$ for a first preset duration $\Delta t1$;

step 303: controlling the first valve device to close, and controlling the air duct control device to turn on;

step 304: as the temperature in the heating area is reduced to the preset low temperature range, turning off the air duct control device;

step 305: controlling the first valve device to switch to the first working state, and a temperature in the heating area is increased to a second preset temperature range $\Delta T2$; and step 306: controlling the working state of the first valve device to switch to the second working state, and the temperature in the heating area is kept in a second preset temperature range $\Delta T2$ for a second preset duration $\Delta t2$.

By setting two preset heating temperature ranges, the food can be further processed. For example, the device in the foregoing embodiments may be used for processing food like starchy. Taking rice processing as an example, a mixture rice and water is put into the heating area, by controlling the first valve device to switch to the first working state, the temperature in the heating area increases to the first preset temperature range $\Delta T1$, and by controlling the first valve device to switch to the second working state, the temperature in the heating area is kept in the first preset temperature range $\Delta T1$ and lasts for the first preset duration $\Delta t1$, and the rice is gelatinized. The first valve device is closed, and after the temperature in the heating area is reduced to the preset low temperature range T3, the mixture of rice and water is frozen and thawed. After the first valve device is controlled to switch to the first working state to make the temperature in the heating area be increased to the second preset temperature range $\Delta T2$, the first valve device is controlled to switch to the second working state to keep the temperature in the heating area in the second preset temperature range $\Delta T2$ for the second preset duration $\Delta t2$, thus realizing retrogradation of the mixture of rice and water. Through the above treatment, amylose dissolved in the water can be converted into resistant starch which is not easily digested by a human body, and the rice can be physically modified, and a content of the resistant starch in the rice can be significantly increased, and a purpose of lowering sugar in the rice can be achieved, and the transformation of the sugar in food in the human body can be controlled, the processed food is healthier, and the demand of people for food processing can be met.

Figure 15:
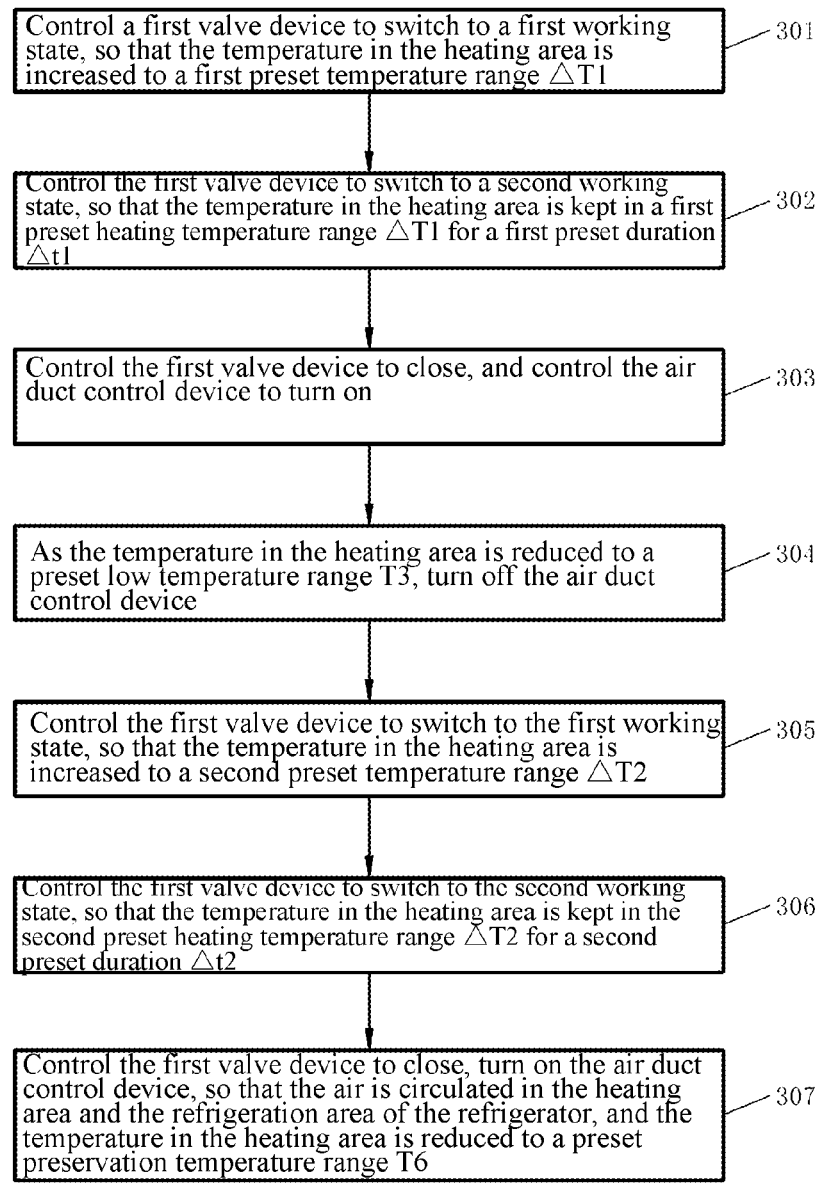
FIG. 15 is a flowchart of a food processing method according to a thirteenth embodiment of the present disclosure.

Referring to FIG. 15, it shows a food processing method in a thirteenth embodiment of the present disclosure, further including the following step of:

step 307: controlling the first valve device to close, and turning on the air duct control device, and the air is circulated in the heating area and the refrigeration area of the refrigerator, and the temperature in the heating area is reduced to a preset preservation temperature range T6. The food is stored in the preset preservation temperature range, and the processed food can be directly kept fresh in the heating area without being additionally taken out and stored by the user.

In the twelfth and thirteenth embodiments of the present disclosure, the working state of the first valve device is controlled to switch to the first working state. As in the above embodiments, the first valve device may be adjusted to the maximum opening degree, or the opening degree of the first valve device can increase the temperature in the heating area. The working state of the first valve device is controlled to the second working state. As in the above embodiment, the first valve device may be intermittently adjusted to keep the temperature in the heating area in the preset heating temperature range for the preset duration. The valve device may also be closed or the opening degree of the first valve may be controlled to keep the temperature in the heating area in the preset heating temperature range for the preset duration. The specific implementation method and principle have been described in detail in the above embodiments, and will not be repeated here.

Figure 16:
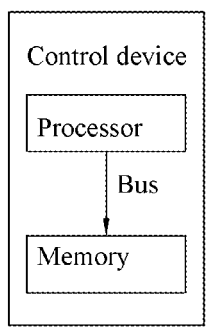
FIG. 16 is a structural schematic diagram of a control device according to one embodiment of the present disclosure.
Figure 17:
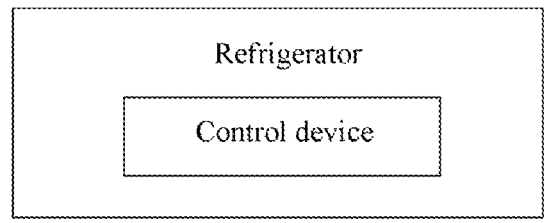
FIG. 17 is a system schematic diagram of a refrigerator according to one embodiment of the present disclosure.

Referring to FIG. 16, it shows a control device according to one embodiment of the present disclosure. The control device may be a control module of any type, such as a control panel, a control box, a control chip, and the like.

In one embodiment, the control device includes: one or more processors and a memory. In FIG. 16, one processor and one memory are taken as an example. The processor and the memory may be connected by a bus or other ways. A bus connection is taken as an example in FIG. 16.

As a non-transitory computer-readable storage medium, the memory may be used to store non-transitory software programs and non-transitory computer-executable programs, such as the control method for the refrigeration device in the embodiment of the present disclosure or the food processing method of one embodiment of the present disclosure. The processor runs the non-transient software programs and instructions stored in the memory, and to realize the above-mentioned control method for the refrigeration device in the embodiment of the present disclosure or the food processing method of one embodiment of the present disclosure.

The memory may include a program storage area and a data storage area. The program storage area may store an operating system and an application needed by at least one function. The storage data area may store data and the like needed to execute the control method for the refrigeration device in the embodiment above. In addition, the memory may include a high-speed random-access memory, and may also include a non-transitory memory, such as at least one disk memory device, a flash memory device, or other non-transitory solid state memory device. In some embodiments, the memory may include remote memories relative to the processor, and these remote memories may be connected to the terminal via networks. Examples of the above networks include, but are not limited to, the Internet, enterprise intranets, local area networks, mobile communication networks, and combinations thereof.

The non-transient software programs and instructions needed for realizing the control method for the refrigeration device in the embodiment of the present disclosure or the food processing method of the embodiments of the present disclosure are stored in the memory, and when executed by one or more processors, execute the above-mentioned control method for the refrigeration device in the embodiment of the present disclosure or the food processing method of embodiments of the present disclosure, for example, execute the above-described method steps 10 to 20 in FIG. 8, method steps 201 to 202 in FIG. 9, method steps 2021 to 2022 in FIG. 10, method step 2023 in FIG. 11, method step 2024 in FIG. 12, method steps 201 to 203 in FIG. 13, method steps 301 to 306 in FIG. 14, or method steps 301 to 307 in FIG. 15.

Referring to FIG. 16, it shows a refrigerator according to one embodiment of the present disclosure, which includes the control device of one embodiment of the present disclosure.

One embodiment of the present disclosure provides a computer-readable storage medium, where the computer-readable storage medium stores a computer-executable instruction, and the computer-executable instruction is executed by one or more control processors, for example, by one processor in FIG. 16, which can cause the above-mentioned one or more processors to execute the control method for the refrigeration device in the foregoing embodiment according to one embodiment of the present disclosure, or the food processing method according to one embodiment of the present disclosure, for example, to execute the above-described method steps 10 to 20 in FIG. 8, method steps 201 to 202 in FIG. 9, method steps 2021 to 2022 in FIG. 10, method step 2023 in FIG. 11, method step 2024 in FIG. 12, method steps 201 to 203 in FIG. 13, method steps 301 to 306 in FIG. 14, and method steps 301 to 307 in FIG. 15.

The device embodiments described above are only exemplary, where the units that are described as separate components may or may not be physically separated, i.e., may be located in one place or distributed over multiple of network units. Some or all of the modules may be selected according to actual needs to realize the purpose of the embodiment.

The steps and systems in the methods disclosed above may be implemented as software, firmware, hardware, and suitable combinations thereof. Some or all of the physical components may be implemented as software executed by a processor, such as a central processing unit, a digital signal processor or a microprocessor, or implemented as hardware, or implemented as an integrated circuit, such as an application specific integrated circuit. Such software may be distributed on a computer-readable medium, which may include a computer storage medium (or a non-transitory medium) and a communication medium (or a transitory medium). The term "computer storage medium" includes a volatile or non-volatile, removable or non-removable media implemented in any method or art for storing information (such as computer-readable instruction, data structure, programming module or other data). The computer storage medium includes, but is not limited to, RAM, ROM, EEPROM, flash memory or other memory technology, CD-ROM, digital versatile disc (DVD) or other optical disc memory, magnetic cassette, magnetic tape, magnetic disk memory or other magnetic memory device, or may be any other medium that can be used to store the desired information and can be accessed by a computer. Moreover, the communication medium typically includes computer-readable instructions, data structures, program modules, or other data in a modulated data signal, such as a carrier wave or other transmission mechanism, and may include any information delivery medium.

What is claimed is:
1. A refrigeration device, comprising:
   a compressor, a condenser, a throttling device and an evaporator, wherein the compressor, the condenser, the throttling device and the evaporator are connected in a sequence to form a refrigerant circulation loop, wherein a connecting pipeline between an exhaust port of the compressor and a refrigerant inlet of the throttling device in the refrigerant circulation loop is a first connecting pipeline, and the condenser is arranged on the first connecting pipeline; and an auxiliary heat exchange branch, wherein the auxiliary heat exchange branch comprises a condensing heater for heating a heating area, the auxiliary heat exchange branch is arranged in parallel connection with the first connecting pipeline; and a first valve device is arranged on the auxiliary heat exchange branch, and the first valve device controls a refrigerant flow of the auxiliary heat exchange branch according to a temperature requirement in the heating area;

wherein the first valve device is provided with a first working state and a second working state, wherein:

the first working state is a state that an opening degree of the first valve device is adjusted to a first opening degree, so that a temperature is increased in the heating area; and the second working state is one of the following states:

the first valve device is opened in an intermittent way, so that the temperature in the heating area is fluctuated in a preset heating temperature range;

the first valve device is closed, so that the temperature in the heating area is reduced from the preset heating temperature range; and the opening degree of the first valve device is adjusted to a second opening degree, so that the temperature in the heating area is kept in the preset heating temperature range.

2. The refrigeration device according to claim 1, wherein the first valve device is a three-way valve, the auxiliary heat exchange branch is connected to the exhaust port of the compressor through the three-way valve at a first end, and the auxiliary heat exchange branch is connected to the refrigerant inlet of the condenser at a second end.

3. The refrigeration device according to claim 1, further comprising an incubator, wherein the heating area is arranged in the incubator, and the condensing heater is arranged on the incubator.

4. The refrigeration device according to claim 3, wherein the condensing heater comprises a condensing heating pipe, and the condensing heating pipe is arranged on the incubator, wherein the condensing heating pipe is arranged at a bottom portion of the incubator.

5. The refrigeration device according to claim 1, further comprising an air duct control device for controlling air circulation between the heating area and a refrigeration area of the refrigerator through an air duct.

6. The refrigeration device according to claim 5, wherein the air duct control device comprises a fan and/or a damper for controlling the air duct to open.

7. The refrigeration device according to claim 5, wherein the first valve device is closed according to the temperature requirement in the heating area, and the air duct control device is turned on according to the temperature requirement in the heating area, so that the temperature in the heating area is reduced.

8. The refrigeration device according to claim 1, further comprising an air duct control device for controlling air circulation between the heating area and a refrigeration area of the refrigerator through an air duct, wherein as the first valve device is in the second working state for a preset duration, the first valve device is closed according to the temperature requirement in the heating area and the air duct control device is turned on according to the temperature requirement in the heating area, so that the temperature in the heating area is reduced.

* * * * *